US010503826B2

(12) United States Patent
Woods

(10) Patent No.: US 10,503,826 B2
(45) Date of Patent: Dec. 10, 2019

(54) COMMUNICATOR

(71) Applicant: Michael E. Woods, Brisbane, CA (US)

(72) Inventor: Michael E. Woods, Brisbane, CA (US)

( * ) Notice: Subject to any disclaimer, the term of this patent is extended or adjusted under 35 U.S.C. 154(b) by 0 days.

(21) Appl. No.: 15/908,681

(22) Filed: Feb. 28, 2018

(65) Prior Publication Data

US 2018/0322109 A1 Nov. 8, 2018

Related U.S. Application Data

(60) Provisional application No. 62/534,203, filed on Jul. 19, 2017, provisional application No. 62/530,288, filed on Jul. 9, 2017, provisional application No. 62/464,387, filed on Feb. 28, 2017.

(51) Int. Cl.
| | | |
|---|---|---|
| *G06F 17/00* | (2019.01) | |
| *G06F 17/24* | (2006.01) | |
| *G06Q 10/10* | (2012.01) | |
| *H04L 12/58* | (2006.01) | |
| *G06F 3/0482* | (2013.01) | |
| *G06F 16/2455* | (2019.01) | |
| *G06F 17/27* | (2006.01) | |
| *G06F 9/451* | (2018.01) | |
| *H04L 29/06* | (2006.01) | |
| *G06Q 50/00* | (2012.01) | |

(Continued)

(52) U.S. Cl.
CPC .......... *G06F 17/248* (2013.01); *G06F 3/0482* (2013.01); *G06F 9/451* (2018.02); *G06F 16/24565* (2019.01); *G06F 17/241* (2013.01); *G06F 17/2765* (2013.01); *G06Q 10/10* (2013.01); *H04L 29/06* (2013.01); *H04L 51/32* (2013.01); *G06F 16/22* (2019.01); *G06Q 50/01* (2013.01); *H04L 67/22* (2013.01)

(58) Field of Classification Search
CPC ........... G06F 17/2765; G06F 16/24565; G06F 3/048; G06F 17/248; G06F 17/241; G06F 16/22; G06F 3/0482; H04L 51/32
See application file for complete search history.

(56) References Cited

U.S. PATENT DOCUMENTS

| | | | | |
|---|---|---|---|---|
| 7,987,491 B2 * | 7/2011 | Reisman | ............... | G06F 16/954 |
| | | | | 725/112 |
| 8,849,862 B2 * | 9/2014 | Visscher | ............... | G06Q 10/06 |
| | | | | 707/792 |
| 9,904,579 B2 * | 2/2018 | Shear | .................... | G06F 16/245 |

(Continued)

OTHER PUBLICATIONS

International Search Report for International application No. PCT/US2018/020331 dated Aug. 8, 2018.

(Continued)

*Primary Examiner* — Laurie A Ries
(74) *Attorney, Agent, or Firm* — Patent Law Offices of Michael E. Woods; Michael E. Woods

(57) ABSTRACT

A system and method for improving an effectiveness of appropriate framed communications. List management of USE, DO NOT USE, and SUBSTITUTE lists for each communications producer, the communications elements conforming to the particular lists enrolled, selected and enabled by each producer of a set of communications producers helps to ensure conformance to effective communications elements for improving effectiveness of communications using those elements.

18 Claims, 17 Drawing Sheets

(51) Int. Cl.
    *G06F 16/22*     (2019.01)
    *H04L 29/08*     (2006.01)

(56) References Cited

U.S. PATENT DOCUMENTS

| | | | | |
|---|---|---|---|---|
| 10,007,664 | B2* | 6/2018 | Donabedian | G06F 17/289 |
| 2011/0208822 | A1* | 8/2011 | Rathod | G06F 16/9535 |
| | | | | 709/206 |
| 2011/0313757 | A1* | 12/2011 | Hoover | G06F 17/274 |
| | | | | 704/9 |
| 2013/0024777 | A1* | 1/2013 | Brakensiek | G06F 3/048 |
| | | | | 715/740 |
| 2013/0085804 | A1* | 4/2013 | Leff | G06Q 30/0219 |
| | | | | 705/7.29 |
| 2014/0278367 | A1* | 9/2014 | Markman | G06F 17/2765 |
| | | | | 704/9 |
| 2014/0330794 | A1* | 11/2014 | Dellenbach | H04L 67/2833 |
| | | | | 707/692 |
| 2015/0294377 | A1* | 10/2015 | Chow | G06Q 30/0263 |
| | | | | 705/347 |
| 2016/0007912 | A1* | 1/2016 | Hu | A61B 5/002 |
| | | | | 600/595 |
| 2016/0086500 | A1* | 3/2016 | Kaleal, III | G06T 19/00 |
| | | | | 434/257 |
| 2016/0103791 | A1* | 4/2016 | Greenberg | G06F 16/285 |
| | | | | 715/202 |
| 2016/0182416 | A1* | 6/2016 | Rathod | G06Q 10/00 |
| | | | | 709/206 |
| 2018/0032997 | A1* | 2/2018 | Gordon | G06Q 20/3224 |
| 2018/0373796 | A1* | 12/2018 | Rathod | G06F 16/9535 |
| 2019/0244222 | A1* | 8/2019 | Rathod | G06F 16/58 |

OTHER PUBLICATIONS

Written Opinion of the ISA for International application No. PCT/US2018/020331 dated Aug. 8, 2018.

* cited by examiner

| term | description | type |
|---|---|---|
| regulations | The term "regulation" is framed from the viewpoint of corporations and other businesses. From their viewpoint, "regulations" are limitations on their freedom to do whatever they want no matter who it harms | substitution |
| the american dream | a concept based more on what money can buy | substitution |
| public revenue | a better term other than tax | use |
| taxing the rich | implies taxes as a punishment | don't use |

FIG. 10

Alternative(s) for this term:

protections
safeguards
defenses

You may want to consider the following before using the term or an alternative:

The term "regulation" is framed from the viewpoint of corporations and other businesses. From their viewpoint, "regulations" are limitations on their freedom to do whatever they want no matter who it harms Cutting regulations [may have a negative impact on the American Dream! Public revenue may be impacted by these changes. Taxing the rich: bad!

Liberal    job-seeking

COPY ALL    TEST ALL    RECOMMEND    LEAVE FEEDBACK

COMMUNICATOR

CROSS REFERENCE TO RELATED APPLICATIONS

This Application claims the benefit of U.S. Provisional Application 62/534,203 filed on Jul. 19, 2017. This application claims the benefit of U.S. Provisional Application 62/530,288 filed on Jul. 9, 2017. This application claims the benefit of U.S. Provisional Application 62/464,387 filed on Feb. 28, 2017. The contents of these applications are hereby expressly incorporated by reference thereto in their entireties for all purposes.

FIELD OF THE INVENTION

The present invention relates generally to machine-assisted communications, and more specifically, but not exclusively, to production and distribution of framed, guided, curated, recommended, or supervised communications.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Cognitive scientists and linguists may suggest that communications, such as commercial and political speech, may be more effective by developing and implementing a sound persuasion strategy. That strategy may depend upon how effectively a communication may be processed by a consumer of that message, specifically whether the consumer has a capacity to receive and process the message.

It is more than a matter of packaging, distributing, and delivering a set of thoughts, but can implicate the physical structures of the brains of prospective consumers as to whether the communication can be received and processed.

For some cognitive scientists and linguists, there may be a concept that includes a model for effective messaging relying upon a use of effective frames and ineffective messaging being at least partially related to use of ineffective frames. A frame may be, in some cases, include a virtual container with a set of images or other communication elements and a set of associated knowledge embodied in the physical structures of a set of brains.

Embodiment in this sense may include a particular collection, arrangement, and operation of neurochemical elements in a brain of a person supporting these frames. Communications may evoke one or more frames, specific communications elements may evoke specific frames, uses of these communications elements to attack, diminish, and/or negate a frame may also evoke that frame. Evoking a frame in any of these ways may boost a strength of the frame in the brain of the receiver of the communication. That is, anything that causes the physical neurophysical components of the brain used to process an incoming communication to become active can strengthen those components and an associated frame even when the content of the message is attempting to counter elements of the associated frame or the frame itself. Famously, a statement asserting "I am not a witch" may strengthen the neurophysical associations of the speaker with witchiness and fail in its intended purpose, namely the logical but ultimately unsuccessful negation. Similarly, "I am not a thief" can easily fail to disassociate a speaker from previous criminal associations.

Effective communications may therefore require careful definition and use of appropriate frames while avoiding counter-effective frames. Even with appropriate frames, the frames may be required to be used consistently over a very long-term. That is, using alternative language and frames designed to weaken or avoid existing frames may tend to produce more effective persuasive communications.

Individuals, corporations, organizations, and governments may all wish to use effective communications including appropriate frames to be used consistently over an extended period. Machines may assist these individuals, corporations, organizations, and governments improving an effectiveness of appropriate framed communications.

The American Medical Association periodically publishes, and updates, a usage guide that includes some recommended language for speaking about conditions, symptoms, patients, and the like. It recommends that a person take some initiative to purchase their publication, study it, and remember to put it into action in various communications. Some specialty divisions of the AMA focusing on particular sub-groups in the AMA stakeholder population will have specialty adjustments to the more general usage guide, with different guidance for stakeholders in its relevant sub-population. These sub-groups may be confronted with publishing its own usage guide, or a supplement to the more general guide. There is a myriad of problems in this scenario, including an expectation that any significant percentage of the population will acquire, study, and implement any single guide, much less multiple guides. There are also the problems of updates, and distribution of updated guidance, which problem is magnified when for each multiple guide. Guides from multiple entities create the potential issue of conflicts in guidance.

In social media communications, there can be a desire to participate in more than just an exchange of words or ideas. There can be a desire for online cooperative or competitive activities, including gambling or virtual adventuring that may be implemented in text format (e.g., an original interactive fiction text adventure game called Colossal Cave Adventure developed originally in 1976, by Will Crowther for the PDP-10 mainframe, which was expanded upon in 1977 and from which many variations were created on the game and ports to other systems in the following years, hereby expressly incorporated by reference for all purposes). Having an easy way to automate, implement, manage, and control interactive competitive interactions over a text-based social media platform could be valuable for some users, publishers, and manufacturers.

BRIEF SUMMARY OF THE INVENTION

Disclosed is a system and method for improving an effectiveness of appropriate communications in a range of applications, including, for example, usage guides, interactive games, grammar, among other possible uses. The following summary of the invention is provided to facilitate an understanding of some of the technical features related to machine-assisted production and distribution of communications, including framed communications, and is not intended to be a full description of the present invention. A full appreciation of the various aspects of the invention can be gained by taking the entire specification, claims, drawings, and abstract as a whole. The present invention is applicable to other communications in addition to political or commercial communications, to other machine implementations in addition to browser implementations, to other communications modalities in addition to words (such as oral and image communications), and to other uses in addition to production and distribution.

An embodiment of the present invention may include a computer-monitored set of interfaces; one interface may support receipt of inputs of elements of a communications from an operator. Either in realtime, near-realtime, or batch mode, a processor coupled to that interface element evaluates those elements against a messaging store. The messaging store may include appropriate frame, communication, or activity elements that the operator would like to incorporate into the communication. The appropriate frame elements may include a set of lists of communications elements (e.g., words, phrases, terms, and the like for written communications). One list may include communication elements that are recommended for use, one list may include communications elements that are recommended to be avoided, one list simply for annotation, and another list may include communications elements that are recommended to be substituted for other communications elements. When an evaluation is triggered, communications that have been input into the interface are compared to communication elements of one or more of the lists. There may be many different actions performed responsive to these comparisons. Discrepancies or deviations may be flagged, the machine may offer the operator with options to decrease incidences of discrepancy or deviation (manually or automatically), those options may include addition of communications elements into the interface to enhance what was present and may include modifying the existing content. The additions and substitutions may be selected from the set of lists.

An embodiment of the present invention may include multiple entities, each curating a set of lists. A user may elect to enroll with one or more entities, each providing a set of lists. During operation, the user may selectively enable different ones, collections, aggregations, or sets of all the curated lists of the entities to which the user has enrolled. The entities invest in production of the sets of lists, and the enrolled users invest in distributing communications conforming to the framed messaging of their enrolled, selected, and active lists.

An embodiment of the present invention may allow for the entity, operator, or another control mechanism to sort, order, rank, or define a hierarchy for different sets of lists, and different communications elements in and among the different lists. Instances of conflicts between evaluations or comparisons of contents of an interface and the enrolled, enabled, and active lists may be resolved by reference to this hierarchy. Further, in cases of a conflict, the interface may present a mechanism by which all available alternatives are presented, indicated, or made available. Various information may be presented, such as list meta information (author, content, title, annotation, instruction) for the various options from multiple lists or sets. For example, the hierarchy resolution process for target one may indicate that set A has an action one. Further, set B may indicate action two for target one, and set C may indicate action three for target one. The interface may operate at one level (presentation, user options, and the like) as if set B and set C did not have potentially conflicting actions, then the interface may also indicate that other actions are available or accessible with respect to other sets with lower priority. In some cases, the action differences may just be presence in a specific set or have different associated commentary or annotation.

An embodiment of the present invention may allow for the entity, curator, system operator, or other control mechanism, to predefine a set of messages (complete or partially complete) on preselected topics or thematic events. Use of a predefined message may partially override an operator's hierarchy settings (when implemented) and temporarily trigger use of the entities' set of lists until the communication is distributed.

An embodiment of the present invention may include determination of conformance measurements or metrics between communications developed by an operator without use of the system against a wide range of lists. Which lists produce the greatest conformance and those lists which produce the least conformance may be used as part of a system (for example an entertainment system, screening tool, or other evaluative element) to reveal some general character or personality traits of the user by gauging which messaging the operator's natural communication is most naturally aligned.

An embodiment of the present invention may include an incentive system by which an entity, a curator, a system operator, communications director, or other interested third party is able to provide those operators who distribute messages conforming to the interested third party's set of lists a reward of some type. By providing a metric of a quality, quantity or other quantifiable aspect of the communications and/or the operator, the system may select an appropriate reward from a range of rewards.

An embodiment of the present invention may include an auction system by which a provider of the service or other auctioneer process matches up communications to be placed with operators willing to distribute the communications. An embodiment may be able to evaluate an appropriateness of individual operators to the auctioned communication based upon other comparisons to other similar or different lists. An entity may distribute a qualification list and operators having a high natural conformance may be selected to distribute the communication. The auction process may bias selection, or control selection, based upon which other lists evaluated for the operator meet certain standards or thresholds.

An embodiment of the present invention may be included in a web browser or other software-enabled system or process, such as an add-on, extension, or integrated therein, in which a portion of the system, including a user interface, is enabled by use of a local process or system on a computer or other processor-controlled device, such as a stored program system, that stores, caches, accesses or otherwise makes use of the database(s) with the lists or features. This browser, system, and/or browser may present content, such as web content, written content, or other content, and that material may include a dialog box or content-input field. The system, such as through the local process, may monitor the state of some or all of the box or input field and compare that to the enrolled and active lists (and implied directives) to provide dynamic feedback to the user regarding the material.

As the state changes, an embodiment of the present invention may trigger different positive comparisons or change previous positive comparisons. For example, this allows tiered or nested effects in which a first substitution creates new positive comparisons with the previous and substituted content that may enable a second substitution that in turn may create new subsequent positive comparisons. This tiering, nesting, or stacking may be virtually unlimited. In some embodiments, the statement monitoring is different from simply keystroke logging in which a trigger is based upon a string of mostly recently entered text characters. Some text expansion tools may only monitor sequences of text characters (and may include a delimiter to trigger an associated action) but this is different from monitoring a state of the input. State monitoring responds to edits and text changes to previously entered text, absent the recent sequence of keys/characters.

An embodiment may include a multimodal input interface for receiving operator communication elements. In one mode, the input interface may provide a limited set of information or options to the operator. In another mode, a more expansive set of information and options may be available. The interface may include a control to switch between these modes.

An embodiment of the present invention may include operator feedback on tuning and developing communications of a list. For example, some data mining processes analyzing actual communications distributed by an operator may discover additional communication elements used by operators who have enrolled, selected, and activated a list. In this way, the entity, curator, or third-party process responsible for management may be able to dynamically build the list of words fitting within a frame of sympathetic operators for a "do use" list (and by extension other consumers of those communications with similar or aligned sympathies). The process may also discover which communication elements are avoided by these operators to dynamically establish communications elements to be included on a "do not use" list. Once one or more of these use lists are established, it may be used to dynamically establish a "use this instead of that" list. An embodiment may completely automate these processes. Pre-established operator characteristic and sympathies metrics may be used to help judge a quality of an operator's contributions to building any such dynamic contributions, updates, and adjustments to their lists.

An embodiment of the present invention may offer lists including communications elements having both objective and subjective characteristics. An objective characteristic includes objectively determinable aspects of a communications element (e.g., is the word spelled, punctuated, and capitalized correctly) and a subjectively determinable aspect (use of element A versus element B when both may objectively have the same or similar meaning). Encouragement and enforcement of these uses of these subjective communications may in some embodiments be quite important as it is this focus, by a collection of all operators, on repetition of the same subjective element (rather than use of alternative elements that essentially mean the same or similar things) that strengthens the message. A collection of operators that are distributing communications that mean the same, but are using a diverse set of communications, may be much less effective than having all the communications say similar things using the exact, or nearly exact, same communications elements. It may be through the extended, consistent, and proper use of the preselected subjective communication elements that third-party consumers and operators may be persuaded and have world views changed. Especially as compared to saying the same thing in many different ways. These embodiments may be even more effective when the lists are painstakingly developed by cognitive and linguistic scientists, or marketing specialists to help in changing understanding and acting upon various concepts by operators and third-party consumers of the communications.

An embodiment of the present invention may include a set of lists developed by an entity such as, for example, to influence how operators and third parties think about government involvement in health care. For this example, consider Obamacare versus the Affordable Care Act, which may be considered objective synonyms. Hypothesize that consumers (operators and third parties) have a positive association with the Affordable Care Act and a negative association with Obamacare. Entity 1 desires to have consumers act in a way that enhances, supports, or maintains the US government involvement in providing health care or make some call to action or other use of the positive association. Entity 2 desires to have consumers act in a way that diminishes, degrades, or reduces the US government involvement in providing health care or make some call to action or other use based on the negative association. Both entities may develop their lists and include Obamacare and the Affordable Care Act in their lists. However, entity 1 may include the Affordable Care Act on a "do use" list, include "Obamacare" on a "do not use" list, and indicate substitution of the Affordable Care Act for Obamacare on a "substitute this for that" list. In contrast, entity 2 may include the Affordable Care Act on a "do not use" list, include "Obamacare" on a "do use" list, and indicate substitution of Obamacare for the Affordable Care Act on a "substitute this for that" list. An operator #1 enrolls, selects, and engages the Entity 1 list and an operator #2 enrolls, selects, and engages the Entity 2 list. Both operators could produce and distribute a communication that objectively means nearly the same thing but may have widely varying impacts on themselves and consumers of those communications.

An embodiment of the present invention may aid individuals engaging in communications within a new community may be unfamiliar with "normal" communication elements used within that community. This may be true for individuals learning a new language (e.g., immigrants) or someone participating in a communication forum dedicated to a particular topic (e.g., lay persons participating in an expert forum). The use of non-standard communications elements may interfere with communication. An embodiment may provide suitable lists for normalizing the communications and allowing these persons to better blend in, particularly for individuals who have a desire to make contributions but do not want to be perceived as an outsider. There can be regional variations in communications patterns, and someone moving from New York to Alabama may desire to use a lexicon more customarily employed by residents of Alabama when producing and distributing communications to accelerate immersion into their new community.

An embodiment of the present invention may provide an automated curator, responsive to public communications in a shared communications session with a set of participants (and possibly non-participating (potentially able to comment) audience members) for engaging in an interactive activity, such as a game. For example, a card game may include a curator that issues both public messages to all participants and adjusts individual game options privately available to just the participant or a sub-set of the entire participant list). These private options may be responsive to the public messages. The curator is able to communicate, publicly or privately, whether supposed game options indicated in a message from a participant, are valid based upon the game state. The combination of individual options and public "plays" changes the state of the activity dynamically, with the control or curator process validating and providing public information and private choices through the interface. For example, a version of poker could be played in which the public messages are provided such as would be known to all participants in a game of personal poker. That is, the number of cards dealt, drawn, discarded, "up cards" and any "bets" and the like. Each player's private interface includes an identification of specific cards for that player. When the player makes a play with one of these cards (hold, discard, draw, etc.) the curator performs the action and provides a message as to whether the play was valid. That is a player attempting to claim a pair of Aces that does not in-fact have a pair of aces, could be flagged publicly by the curator/controller as an invalid play.

An embodiment of the present invention may provide for the computer or process system that is receiving information for third-party consumption, with guidance by the sets and specified actions associated with recognized triggers. The interface may be integrated into the browser, it may be enabled on a webpage to allow access by browsers without the installed interface elements (e.g., mobile browsers that do not allow for add-ons, extensions, or the like). In some instances, there may be certain interface elements only available based upon a degree of integration of the interface with the application/browser and user option. For example, different websites may not be uniform in identifying or responding to user-provided content. Some websites accept user input in dynamic input controls that may offer unpredictable responses to the extension (one website may allow some user input to be red-underlined while another may not do so). When enabled, this may be referred to as "native" support for the browser/website combination. For non-native support, using a web-enabled service (allowing cutting and pasting) or a special interface element associated with an input field. That indicator may be associated with one or more input fields, and user material presented in those input fields may not have a standard response based on the active fields. However, the indicator may nonetheless indicate that the enrolled and active sets are interacting in some way with that text. Except for the indicator, there may be no other flag or awareness provided to the user. The indicator may be simple binary (action or not) or may provide more detailed feedback (a number of use, don't use, and/or substitutions available). In some embodiments, the embodiments may launch a special native mode dialog to allow the content to be more completely and thoroughly evaluated.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 05 illustrates an embodiment for a configuration interface for a particular set of the portfolio;

FIG. 06 illustrates an embodiment for a configuration interface for a particular term of a particular set;

FIG. 10 illustrates a portion of a configuration entry of a particular set which for this purpose may be referred to as "Liberal" set;

FIG. 17 illustrates an embodiment of an expanded user interface produced from the presentation pop-up interface of FIG. 16.

DETAILED DESCRIPTION OF THE INVENTION

Figure 1:
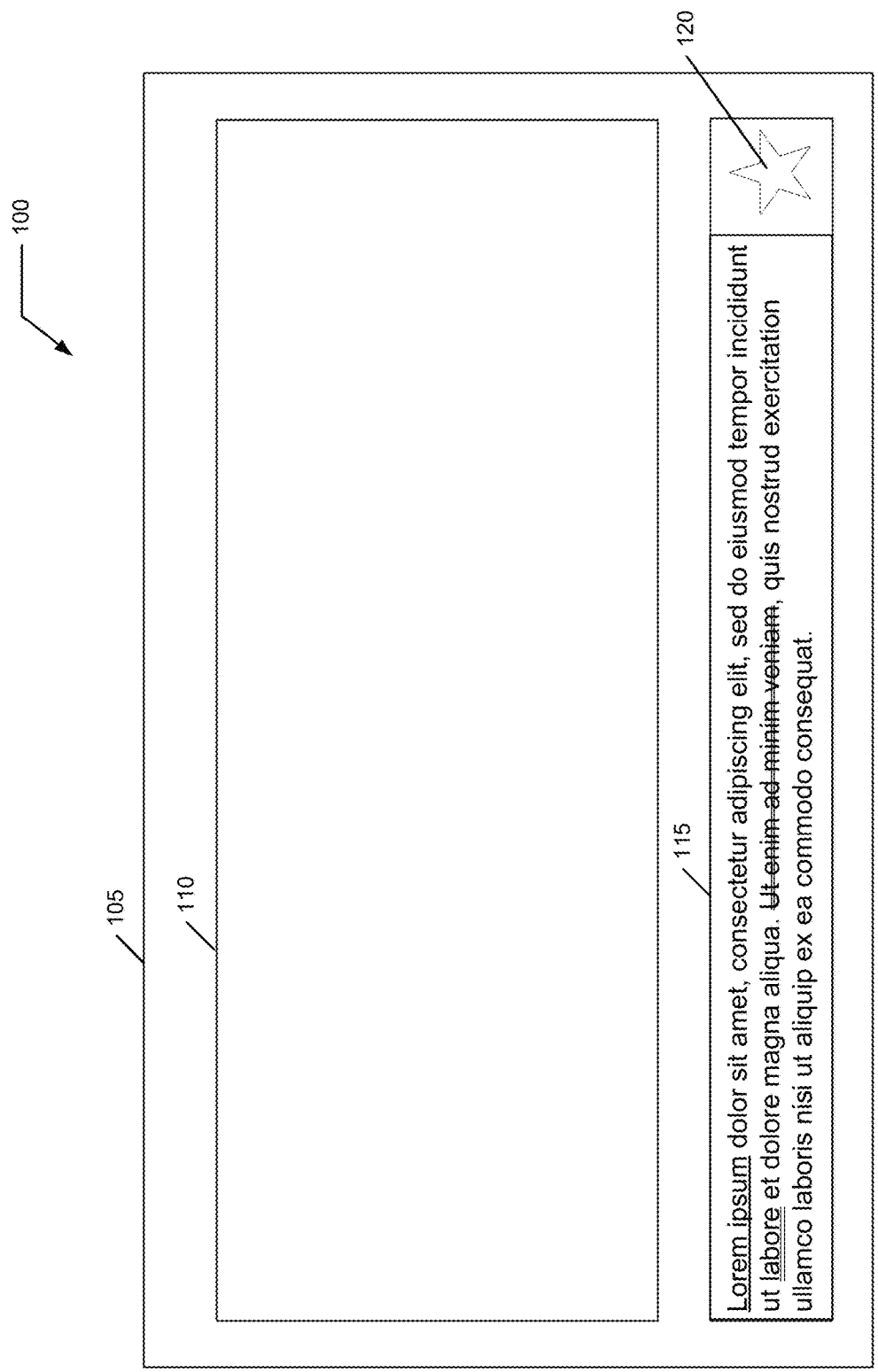
FIG. 01 illustrates a written communication interface that includes a communication container.

Embodiments of the present invention provide a system and method for improving an effectiveness of appropriate framed communications. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

FIG. 01 illustrates a written communication interface 100 that includes a communication container 105. Container 105 may include a presentation panel 110 in addition to an input panel 115. Container 105 represents a bounded display element that defines and supports panel 110 and panel 115. Container 105 may include an element from a machine-generated process such as a word processor page, a spreadsheet page, a web browser page, or other display presentation modality that may resemble a page or some other output structure.

Optional presentation panel 110 may include some communication content. That communication content may have been received remotely from another user through container 105 or produced locally by a communication producer or some third party. For example, when container 105 includes a web browser page, that page may represent some communication from a communication content site (e.g., flickr, facebook, instagram, google hangouts, linkedin, twitter, pinterest, tumblr, reddit, vine, youtube, foursquare, snapchat, swarm, kik, yik yak, shots, periscope, medium, sound cloud, tinder, whatsapp, slack, musical.ly, peach, blab, or user comment section of a blog, news media, or other electronic message outlet, and the like).

Often these sites include a user input control to allow the communication producer to generate new content to be uploaded and distributed according to the distribution and viewing rules of the particular site. Input panel 115 may include such a user input control.

The communication producer interacts with the frame communicator through an input control appropriate for the communication (e.g., written communications may include input panel 115 accepting words from a keyboard, pen/tablet combination, speech-to-text or other mechanism to record words, or spoken communications may provide an alternative input panel 115.

During operation, the communication producer enters words, directly or indirectly, into input panel 115. In realtime, near realtime, or asynchronously, a frame communicator process monitors the content of input panel and compares them against the various lists to which the communication producer has selected, enrolled, and activated. Based upon an evaluation and suggestion process, which may include a suggestion hierarchy or other suggestion guidance, various indications may be made within input panel 115 to indicate various possible actions for the communications producer.

These indications may include, for example, marking various communication elements (e.g., words or sets of words) within input panel 115. Those markings may include color changes, highlights, underlines, or other visual cue that the communication operator may wish to evaluate use of the indicated communications elements in this particular communication.

Those indications may, for example, include recommendations based upon the enrolled, selected, and active list(s) during production of the message. That is, some communications elements may indicate one or more of: elements not be used, elements to be used, and elements for which there is a recommended one or more alternative elements. A communication element may, for example, be underlined in a red line when it is not to be used, it may be underlined with a green line when it is a recommended element, and it may be underlined with a yellow line when there are substitutions available.

Machine-implemented interfaces 100 typically include some mechanism for the user to control a focus, select control elements, and otherwise interact with container 105, a machine supporting container 105, or other machine or process associated with interface 100.

These mechanisms may include some absolute or relative pointing mechanism that controls a selection element that may be positioned within container 100. The mechanism may include one or more controls to identify a particular control activation at the position of the selection element. For example, a computer system operating a web browser processor using a microprocessor to visualize a webpage on a display may also present a cursor on the display. That cursor may be positioned in the webpage or elsewhere on the display using a mouse or the like. The mouse may include user-actuable buttons. Often the webpage or other container 105 includes various types of controls that react in predictable ways to actuation of a particular button when the cursor is positioned over the control.

These controls may be overlaid or incorporated into the indicator and marking system. That is, the indicator may enable the communication producer to interact with the indicated communication element to activate desired functions. To illustrate this, "Lorem" in panel 115 is underlined (representing "green" or OK to use), "labore" is double-underlined (representing a "yellow" or substitutions/recommendations available for use), and "Ut enim ad minim veniam" double strikethrough (representing "red" or DO NOT USE) communication elements. There may be many different variations on different indicators and associated operations.

For example, positioning the cursor over a red indicated communication element may allow interface 100 to generate a new interface element (e.g., a popup information window, additional dialog, or the like) that provides options or explanation for the red indication. Green indications may not require explanation or some similar new or modified interface element may provide some background, context, or explanation. The yellow indication may allow the communication operator to see and choose which substitution to make.

In some cases, interface 100 may add a new control interface element 120 into each input panel, the control interface element 120 allowing for the communication producer to activate or select additional or more advanced options. For example, activation of control interface element 120 may produce an enlarged interface element illustrated in FIG. 02.

Figure 2:
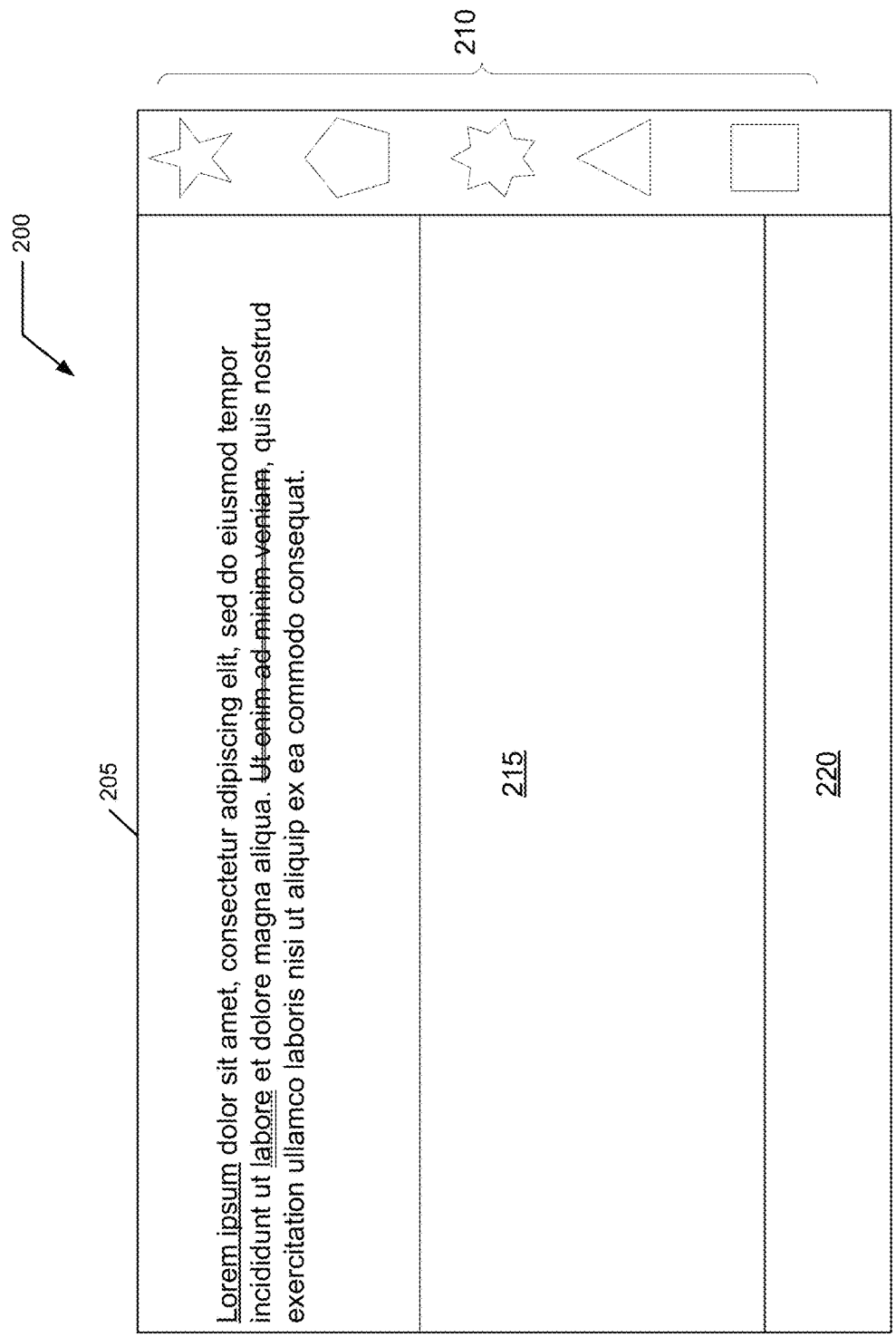
FIG. 02 illustrates an enlarged interface element, such as may be enabled by actuation of a control interface element of FIG. 1.

FIG. 02 illustrates an enlarged interface element 200, such as may be enabled by actuation of control interface element 120 of FIG. 01. Element 200 may include a larger input interface element 205 for receiving and processing of communications elements.

Element 200 may also include a set of controls 210. These controls may be used to return to the element 120, along with any changes made to the content of interface element 205. Additional controls may include an option to customize the presentation of indicators, account management, premium or upgrade elements, list provider management including identification, enrollment, selection, and activation, as well as an option for a hierarchy control to establish indications in the event of conflicts with the various active lists. That is, one active enrolled list may suggest a communication element is on a DO USE list and another active enrolled list may suggest that same communication element is on a DO NOT USE list. Hierarchy management may provide that one list predominates over the other(s), establishes a rank order for application of lists and resolution of conflicts, or may define alternative lists to avoid use of communication element in some contexts. Some third party or list providers may provide alternative element choices and the hierarchy manager may access such alternatives.

Interface element 215 may provide for additional feedback and context for substitution presentation and choice, explanations of indications regarding the communication elements in control 205. Interface element 220 may include recommended or promoted communications, links, specific messaging requests, organizational messages, and the like from enrolled or promoted entities. A communication producer may copy and paste to transfer content from interface element 220 to interface element 205, or in some cases a transfer control may automatically populate some or all communications elements from interface element 220 to interface element 205.

Some content of interface element 220 may suggest production and distribution of communication elements with particular media venues. A control of element 200 may provide for directing a delivery of the content of interface element 205 to the targeted media venues.

As illustrated in FIG. 01, panel 110 may present background or contextual communications that the communications producer would like to comment about, respond to, or reference. In some instances, interface 100 and/or element 200 may have access to this content. The communication producer may allow the system to access and analyze the content to produce various statistical assessments, probabilistic determinations, data mining functions, list recommendations, list provider recommendations, targeted messaging from third parties, valuation of communications potential (i.e., number of followers or readers in different venues), list development, personality and propensity scores, among a range of different uses.

Some of the results of provided, entered, deduced, calculated, looked up, assessed, scored, and other evaluations and metrics of the communication provider and/or content of panel 110 and panel 115, along with enrollments and ultimate final communications, may be reflected in the content of interface element 220 as well as the indications made regarding communications elements in element 205 and panel 115.

The more that system understands the nature and type of communications that any communications producer desires to produce and distribute, the better customization may be provided to the user regarding applicable lists, customizations to those lists, and appropriate indications to make regarding the applicable customized lists.

Additionally, certain third parties may wish to access certain communications producers having certain qualities as measured and evaluated by various metrics and assessments. In some cases, the system may enable an auction system in which a third-party content/message provider will provide some incentive for access to some number of particular communication providers. There may be many different implementations of an incentive or auction system, and many different metrics could be used.

In some cases, the system may share incentives received from third parties or provide different incentives to the communications producers from those provided by the third parties.

A scoring system for messaging fidelity may be established using a conformance between a proposed message and one actually produced, particularly with regard to communications elements from applicable lists. That is, a communications provider may achieve a higher score the more that the producer uses desired communications and avoids undesired elements. In some cases, there may be no flexibility and the metric is binary: no "NO USE" communications elements were used and all "USE" communications were used. Some communications elements on the various lists may have points or other valuation and communications can be scored (both plus and minus scores) based upon number of uses of particular words having particular values.

In some cases, certain sets of communications producers may be able to directly modify various lists, indirectly through communications elements selected and/or avoided and/or substitutions made (dynamic tracking of one or more of a set of communications producers). Lists may be developed from one set of communications producers and/or third parties and recommended to a second set of communications providers. For example, a first set of native language speakers of language A may be used to develop a set of lists and then a second set of non-native language speakers may use those lists. Of course, the selection of the different sets of communicators may be made based upon a range of criteria.

The system may also employ spelling, grammar, diction, usage, or other communications engines to help improve message. In some cases, it may be desirable to degrade a quality of spelling, grammar, diction, usage, and other "proper" communications engines to produce and distribute effective communications in some usage cases. The use of lists allows for a practically limitless ability to define and implement arbitrary communication elements on various sets of lists, even apparently conflicting word choices and arbitrary substitutions.

Figure 3:
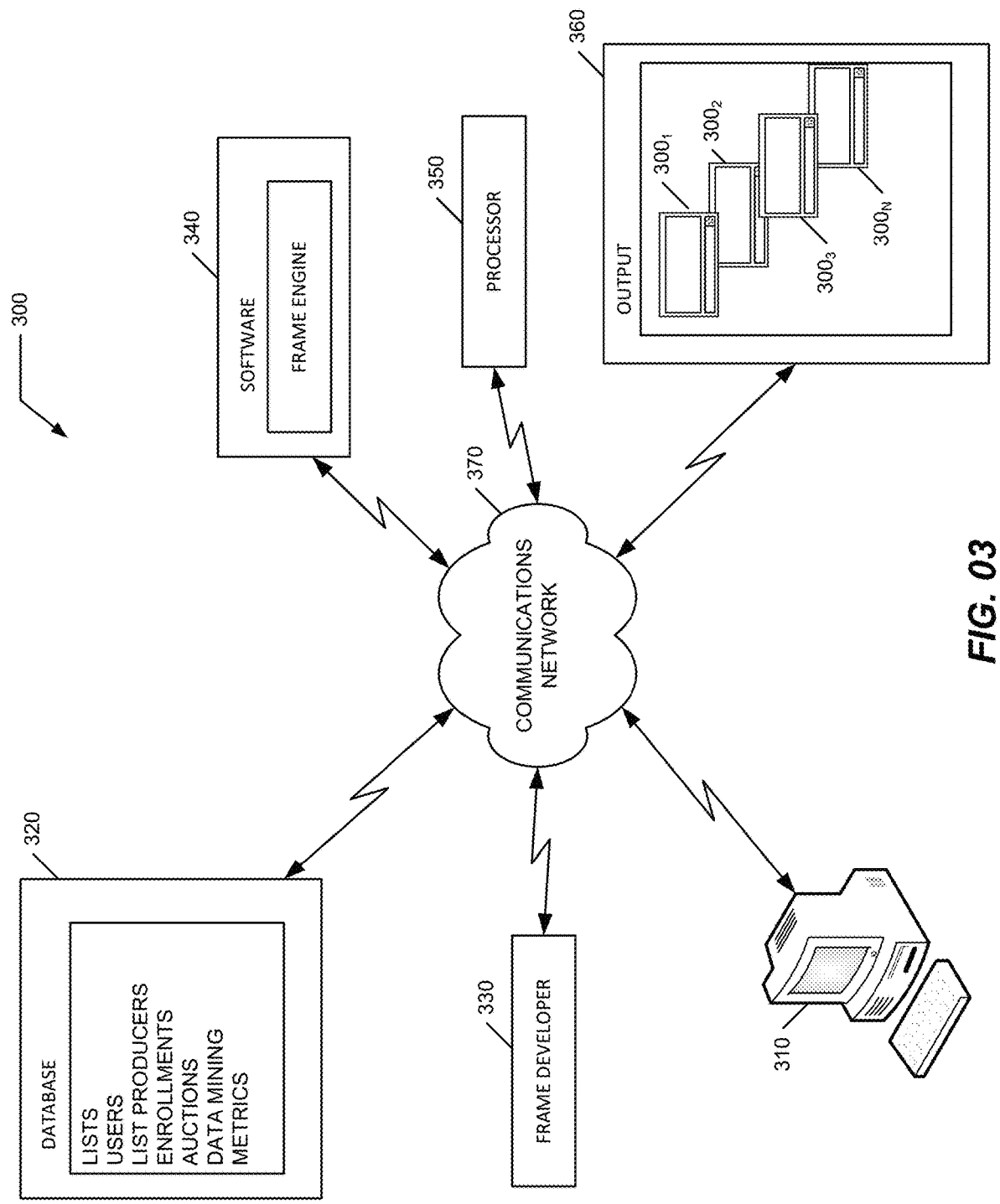
FIG. 03 illustrates a system for assisting in production and distribution of communications from a plurality of communications producers ($300_x$, X=1 to N), such as by using and controlling a computer-implemented interface of FIG. 1.

FIG. 03 illustrates a system 300 for producing and distributing communications from a plurality of communications producers (300$_X$, X=1 to N, N an element of a set of producers {1, 2, 3, 4, 5, 6, 7, 8, 9, 10, . . . 20, . . . , 30, . . . 100, . . . 200, . . . 300, . . . , 1,000, . . . 2,000, 3,000, . . . 100,000, . . . 1,000,000, or more), such as by using a computer-implemented interface of FIG. 01. To summarize, one proposed approach provides an automated evaluation of draft communications, using various lists of communications elements that should be used, should be avoided, and should be substituted, among other lists. Some advantages may include the communications producer realizing production and distribution of more effective communications, reduction of ineffective communications, and more comfort in participating in communications within a particular community through use of lists helping to provide conformance with community norms.

Figure 4:
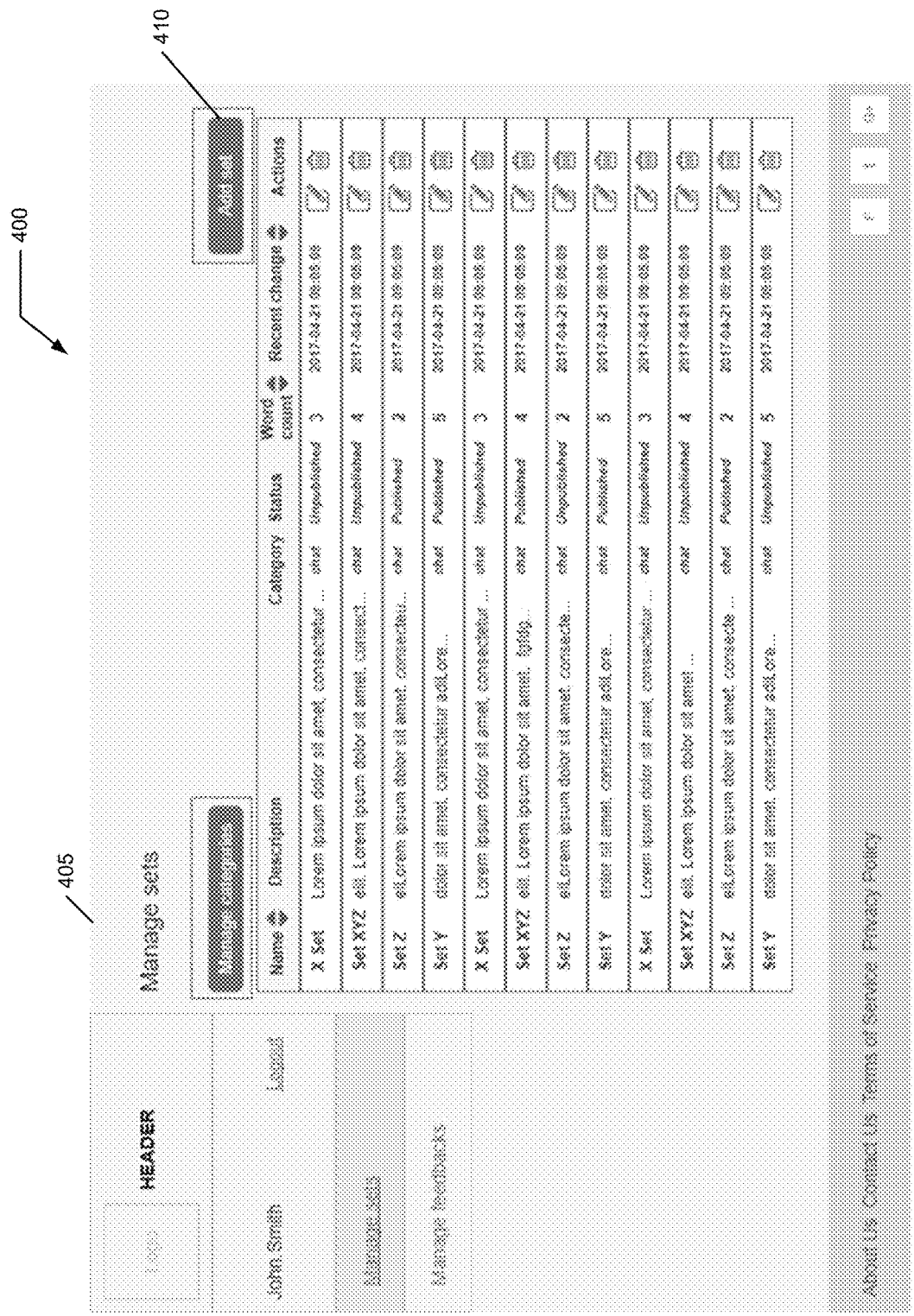
FIG. 04 illustrates an embodiment for a configuration interface for management of a portfolio that includes all available sets.

FIG. 04 illustrates an embodiment for a configuration interface 400 for management of a portfolio that includes all available sets. The frame engine of software 340 may be said to include a parsing function and an interface function. The parsing function evaluates a communication responsive to a set of configuration information such as may be stored in a database on a server computer or in some embodiments on a host computer.

Interface 400 is an example of a configuration mechanism that may be used to partially or wholly configure the parsing function. As described herein, one embodiment for an organizational scheme for the present invention is to allow for a portfolio of solutions, each solution is defined by a set, with each set including one or more lists, and those lists may include one or more terms that are recognized by the parsing function for particular functions.

In addition to terms for use, don't use, and substitutions, other terms may be flagged for different operation by the parsing function. For example, in some instances it may be desirable to provide a pure annotation in which additional information is presented—some discussion or background associated with, or complementary to, the trigger term.

In some embodiments, not all terms will be provided from a specific set definition. There are certain terms that may be enabled for use that are provided from the system, an administrator, a list producer, set creator, third-party interactor (e.g., an advertiser, incentive, interested party, or the like). These additional terms may be provided based upon one or more activated sets, user metrics, and/or communication metrics, or some system configuration option.

For example, it may be desired to provide some information regarding a special term to all communicators or a particular subset of communicators. A "universal" special trigger for this special term may be activated for all or some communicators irrespective of how the communicator has configured the system. For example, unregistered communicators may agree to enable this feature and registration may include an option to disable this service. Registered users may receive an incentive to enable this service. Third parties, for example an advertiser, may provide a system operator with compensation for enabling a particular universal trigger term, that compensation may be negotiated or determined by some alternative process (e.g., auction). The nature of the solution allows for multiple different content, from the same or different entity, to be active for a single special trigger term. For example, the annotation feature or substitution feature may be a useful type of universal trigger, with each content provider providing a different content, substitution, annotation, or the like. These universal special triggers may be flagged using a special indicator. The appropriate communicator(s) typing, pasting, or otherwise producing the special trigger term in their communication would have the universal special trigger flagged and the communicator would have an option to interact with it. A universal special trigger may have an advantage over a system, which for example, has pre-processed words in a page rendered for reading because of an attention difference. A communicator preparing a message may devote more attention to the content of a message that they are preparing to send as opposed to a page rendered that they may not be devoting much if any attention. Thus, highlighting at a time of pre-communication preparation may be expected to be particularly advantageous to achieving attention from the communicator. It may also be for this reason that more caution is to be employed using this feature to avoid distracting communicators and perhaps inducing the communicator to be displeased with the service.

This service may include different modes or implementations. In one mode, the system is unaware and does not track, note, or otherwise understand which users have used the special trigger term. In another mode, some type of tracking, notation, or understanding of particular users or anonymized classes of users may be used by the system. Some content associated with a universal special trigger may include an incentive, coupon, resource, special offer, gift, or the like that may require that the communicator self-identify, provide some personally identifiable information, or authorize the system to provide that information on the communicator's behalf.

A page 405 may include a list of all sets, one set per row, each representing a different set. Summary information may be provided for each set, in columns, such as set name, set description, set category, set status, set term count, set timestamp, and an associated set of actions appropriate for operation on the set.

Categories may be used by a communicator to filter/locate particular sets. A set status may include unpublished, public, public premium, and private. A set status may affect whether and how it is presented in an extension interface menu. For example, an unpublished set may not be able to be selected for operation, a public set may be available to any communicator, while public premium may be available to registered communicators only. Private sets may be available to selected authorized users and premium private sets may require that the authorized users be registered. Sets having an associated private status may be available to only selected communicators by invitation or special log-in credentials or the like.

Appropriate actions may include for set creators/editors, an edit and delete action. For a user, an appropriate action may include selection or deselected, and with regard to private sets, provision of access credentials. All selected, which may be all or fewer than all, sets are made available to communicator through an interface control.

Page 405 may include a control 410 to add a new set to the portfolio of sets.

Figure 05:
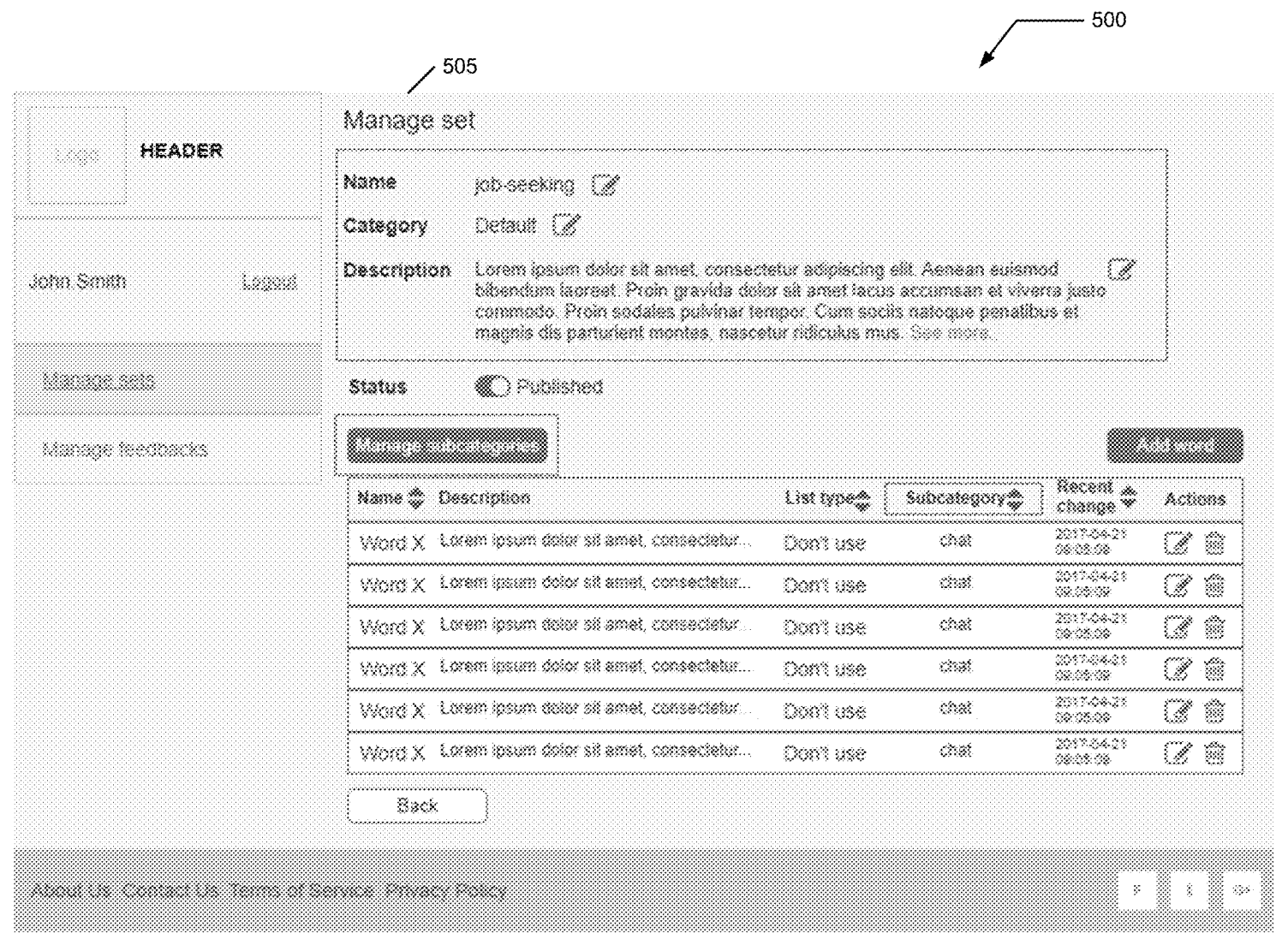

FIG. 05 illustrates an embodiment for a configuration interface 500 for a particular set of the portfolio. Each set may have some associated information including a name, a category, a description, a control for status (e.g., unpublished, public, public premium, private. Other controls may include management of sub-categories for individual terms (e.g., name, adding/removing/editing) and adding new terms to the set.

In some embodiments, it may be desirable to provide for sets to identify terms in a hierarchy, such as category/sub-category or in other cases a third or more additional sub-categorization. For example, one set of terms may have an all or a "genus" hierarchy while one or more other sets of terms may represent one or more "species" hierarchies. In some embodiments, it may be desirable to enable a user to select the genus set of terms and optionally one or more species sets of terms.

For example, a set creator may fashion a set about sports. The genus terms may be relevant generally to all sports. The set creator may fashion sub-sets regarding individual sports (e.g., soccer, football, rugby, tennis, etc.). A communicator interested in communicating regarding soccer may select the sports set and select just the soccer sub-set, while other communicators may select the set and all sub-sets or particular sports species as appropriate to them at any given moment.

Similar options are available for a political candidate as a genus and different species sets regarding particular positions of interest to the electorate. A company may have a genus regarding the company in general while different species may be relevant to particular products or services offered by the company. A statewide ballot set may have a genus regarding voting and initiatives in general and provide a species for each particular initiative. An organization concerned about the environment may have a genus about the environment in particular and various species sub-sets regarding global warming, animal preservation, clean air, clean water, clean energy, and the like.

Each term of a set is summarized as a row on a set configuration page 505. Each such row including the term (which may be 1 or more words, symbols, phrases, or other machine recognizable element or elements that may be used by the parsing function as a trigger. Each row further includes a description, a list type (in some embodiments one or more lists are integrated together), a sub-category designation, a time stamp, and a set of appropriate actions. The actions may include edit and delete functions for a creator/editor; or for a communicator a selection/deselection option. In some embodiments this may implemented in the manage sub-categories control option. There may be included an option to select/deselect specific or all sub-categories. When implemented on page 505, individual terms may be enabled/disabled. When performed by the creator/editor, it affects all communicators who have selected the set and when performed by an individual communicator it would affect just that communicator.

Figure 06:
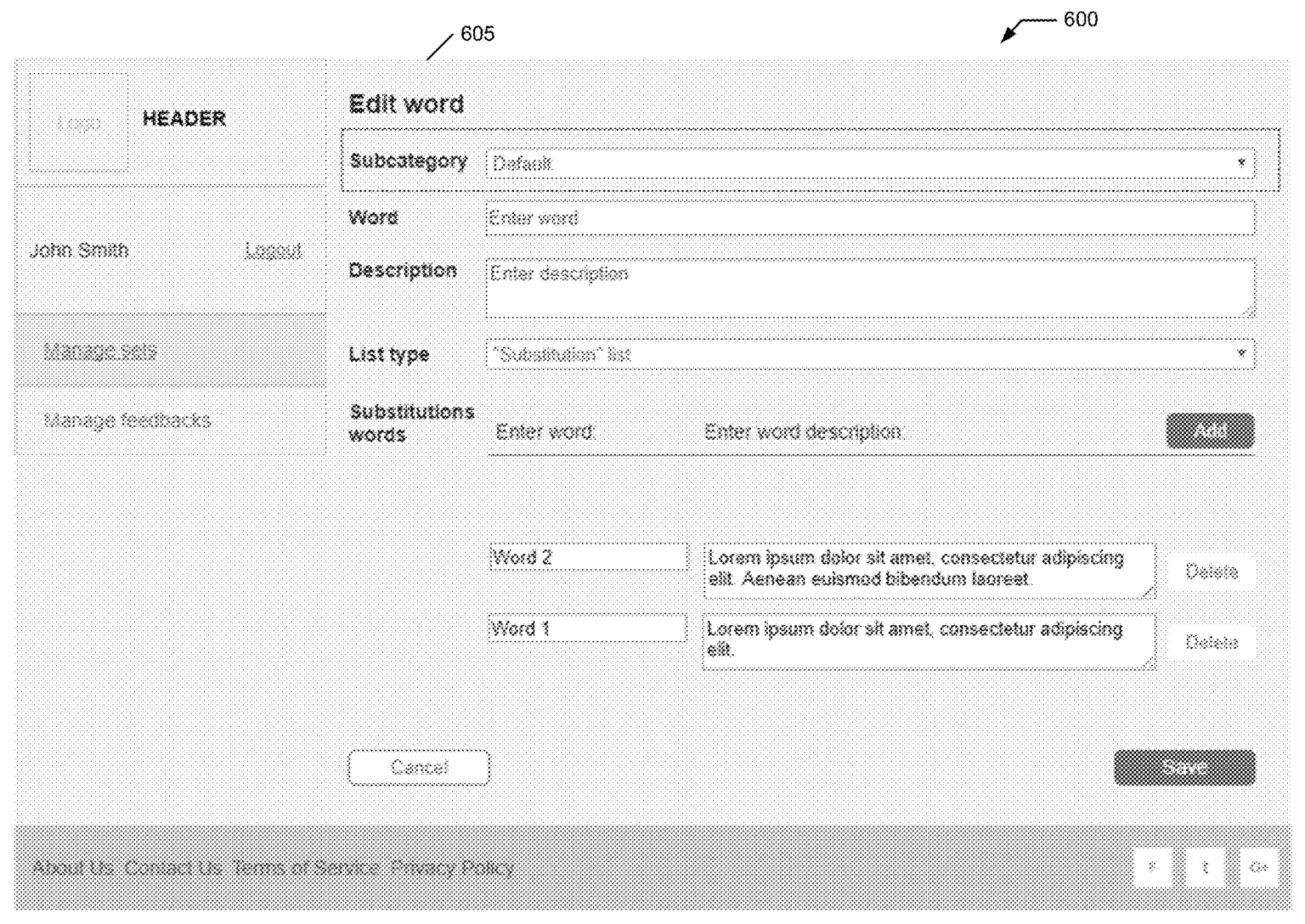

FIG. 06 illustrates an embodiment for a term configuration interface 600 for a particular term of a particular set. Configuration of a term may be implemented on a term configuration page 605. Each term may include a sub-category, the term itself (which may become a trigger for the parsing function, such as when a communicator has selected and actuated a set including that particular term). Configuration options may further include identification of the type of list (e.g., use, don't use, substitution, annotation, and the like). The configuration page may dynamically respond to the choice of list type, such as by providing additional options for entering alternative terms when the list type is substitute or annotation options when the list type is annotation.

The substitutions options include an ability to identify one or more substitutes for the trigger word, as well as to delete undesirable or unnecessary substitution alternatives.

Figure 7:
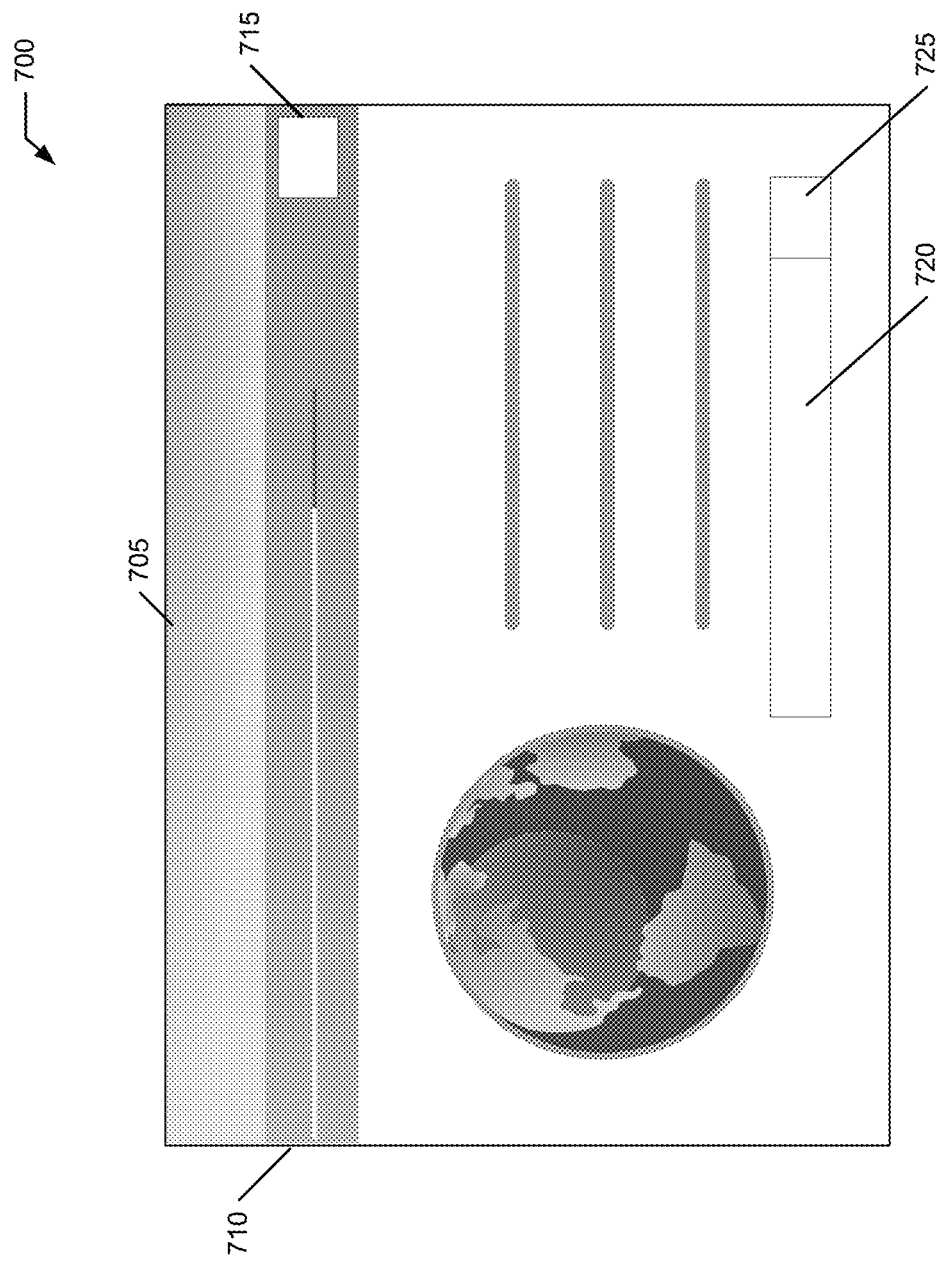
FIG. 07 illustrates an embodiment of a user interface, for example, a web browser, implementing an extension.

FIG. 07 illustrates an embodiment of a user interface 700, for example, a web browser 705, implementing an extension or other mechanism for customizing operation such as a plug in, control, or the like. Browser 705 includes a menu bar 710 and installation of a custom extension may present a custom extension control 715 to a communicator when browser 705 is used.

Browser 705 renders various web pages and many pages of interest to a communicator include some form of an input panel 720 where the communicator may form a communication for sharing with an audience. Input panel 720 is responsive to the custom extension as described herein in responding to content therein, whether created and/or pasted by the communicator.

In some embodiments, input panel may be provided with, directly or in association, an extension widget 725.

Figure 8:
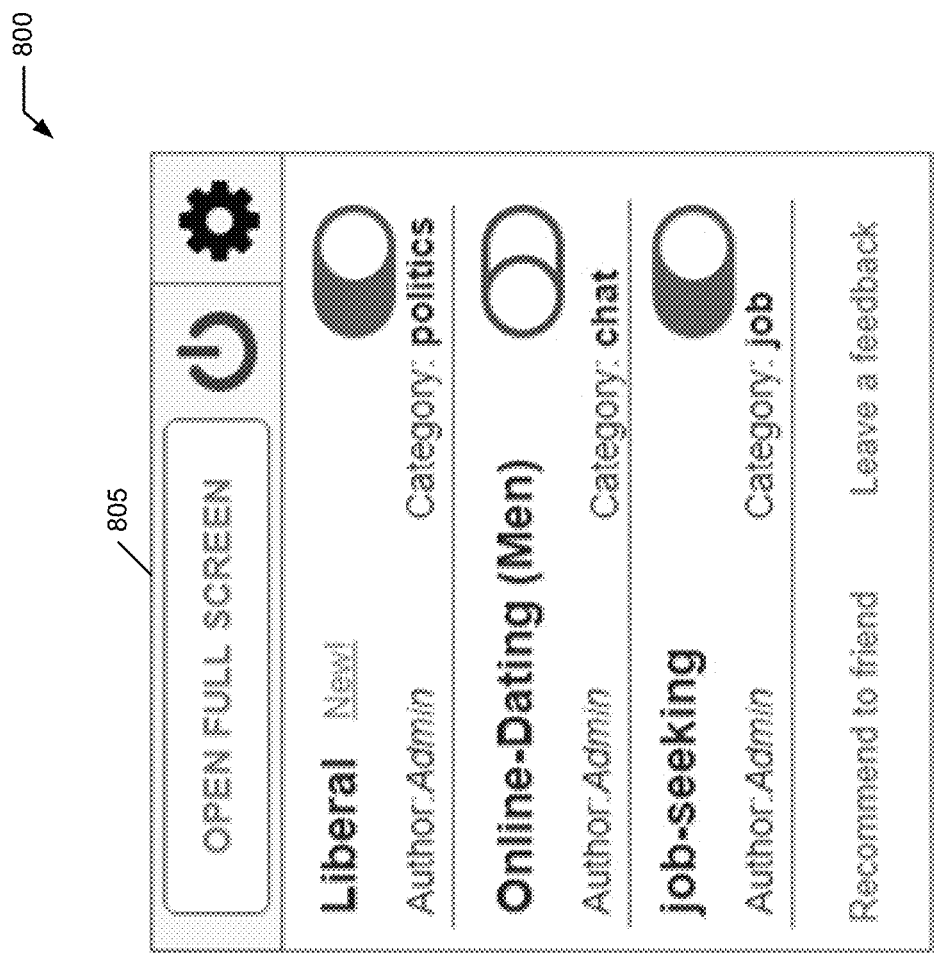
FIG. 08 illustrates an embodiment of an extension interface menu.

FIG. 08 illustrates an embodiment of an extension interface menu 800. Menu 805 may include a dialog window that includes a number of controls and a list of sets that have been selected by the communicator (or all available sets when no selection mechanism is provided). The controls may include an "open full screen" option in which a special scratchpad screen is presented (such as in an additional tab of browser 705 or a standalone dialog window) to the communicator. Other controls may include a blacklist control and an options selector.

The scratchpad may include a special mode in which a special webpage is opened. That special webpage may be coupled to the server hosting the system and thus has the set definitions and other options accessible. In some embodiments, it may be contemplated that the custom extension locally processes a pre-communication prior to the communicator issuing, posting, sending, sharing, or the like. That processing is performed by local resources of the local processing system, working with the selected and actuated sets and other applicable options and features as described herein.

However, it is possible that not all input panels 720 are compatible with the extension and the extension may fail to recognize triggers, fail to provide the suitable indications, fail to provide the pop-ups, and/or other inappropriate function or action. In some cases, the custom extension may interfere, degrade, and/or otherwise negatively impact a communicators desired interaction with a web page rendered by the browser.

An embodiment may include some options to address such incompatibilities and degraded performances. One option is provision of the scratchpad which offloads functions and features to the host server for pre-communication processing. The communicator may process on the scratchpad and then copy all from the scratchpad and paste into any input panel, thus avoiding the problems.

The scratchpad may duplicate or produce a compatible version of some of the controls, option selection, and other local interface details, and interact directly with the server, to enable the pre-communication to be evaluated by the parsing function, indicator function, and messaging function, as appropriate. For example, sets are activated, the pre-communicated is parsed for those trigger terms in those active sets, identified triggers are indicated, and any associated messaging relevant to those identified triggers in provided to the communicator for consideration in editing the pre-communication. When ready, the communicator copies the edited pre-communication from the scratchpad and pastes it into a desired input panel.

This option has an advantage in overcoming/addressing extension incompatibilities with particular input panels, but it is also the case that many browsers are not configured to support extensions or other customized processing. This is true for most mobile processing and therefore without the scratchpad feature, an extension (or the like) function or service using the portfolio may not be available to a mobile user. Provision is made, e.g., a control on a website configured for operation with the portfolio and providing the software engine functions, for the mobile user to access this control and use their standard browser to open the special scratchpad directly. The communicator may then paste the processed pre-communication into any application that accepts pasting from the clipboard or the like.

Another option to reduce incompatibility is provision of white lists and blacklists. When compatibility with a site is demonstrated to a satisfaction of the service operator, that site is added to a white list associated with the service. This white list thus represents all known compatible and likely compatible sites, and in this sense is a universal white list controlled by administrator. The realtime, in-line functions as described herein may be disabled in some embodiments. Then, each communicator may manage a user-specific blacklist that effectively removes one or more sites from the white list. Different users may have the service active with different sites as compared to other users by virtue of having different entries in the local blacklist (which may be stored on the server but implemented locally) or may be implemented specific to each browser or each computer. One of the controls may be used to add the site currently in the address window of the browser to the custom blacklist and thus turn off the extension software engine for that site, and any other sites on the blacklist.

In addition, to the controls, each selected set is presented in the menu interface and includes an associated actuation control. The associated control determines whether, at any given moment, the software engine recognizes the set configuration triggers, descriptions, substitutions, annotations, and the like for any particular set. As illustrated, the communicator as actuated two sets: a "Liberal" set and a "job-seeking" set. An "Online-Dating (Men)" set is shown deactuated. The communicator may interact with the associated controls of these sets to change which are actuated and which are deactuated.

Should the communicator wish to actuate a set not available in interface menu 800, the communicator may need to return to a manage set function and first select the desired set for possible actuation so it loads into dialog 805. Thereafter the communicator may selectively, and repeatably, actuate and deactuate individual sets.

Dialog 805 may include additional information from the host, such as whether a set is new, revised, who authorized it, to what category it pertains, and the like. The dialog may include controls for "recommend to a friend" and "leave feedback" or other options for interaction/selection by the communicator operating dialog 805.

Figure 9:
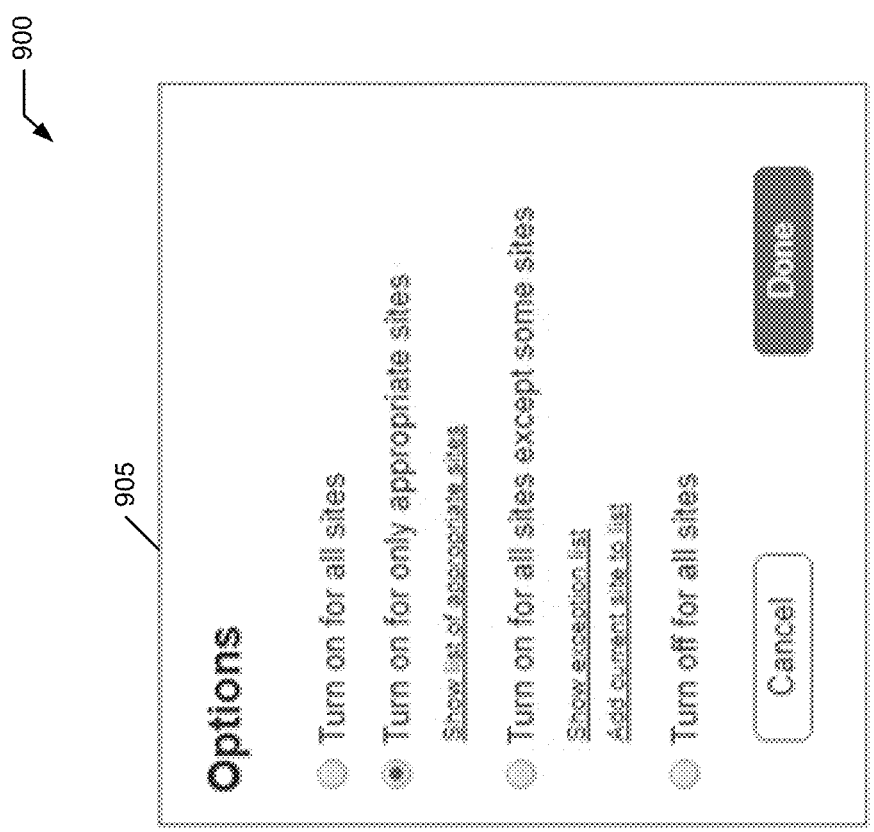
FIG. 09 illustrates an embodiment of an options interface menu.

FIG. 09 illustrates an embodiment of an options interface menu 900 which may available through interface menu 800 illustrated in FIG. 08. Menu 900, as illustrated, includes options for controlling the black list: turn on for all (e.g., ignore the white list) sites, turn on for appropriate sites (e.g., remove all entries from black list), turn on for all sites except some (e.g., edit sites on black list), and turn off for all sites (disable realtime in-line operation).

FIG. 10 illustrates a portion of a configuration entry 1000 of a particular set 1005 which for this purpose may be referred to as the selected and actuated "Liberal" set identified in menu 800. Set 1005 includes four terms: a) "regulations" b) "the american dream" c) "public revenue" and d) "taxing the rich" and more may be defined in entry 1000. Summary information is presented, such as the description and list type.

Figure 11:
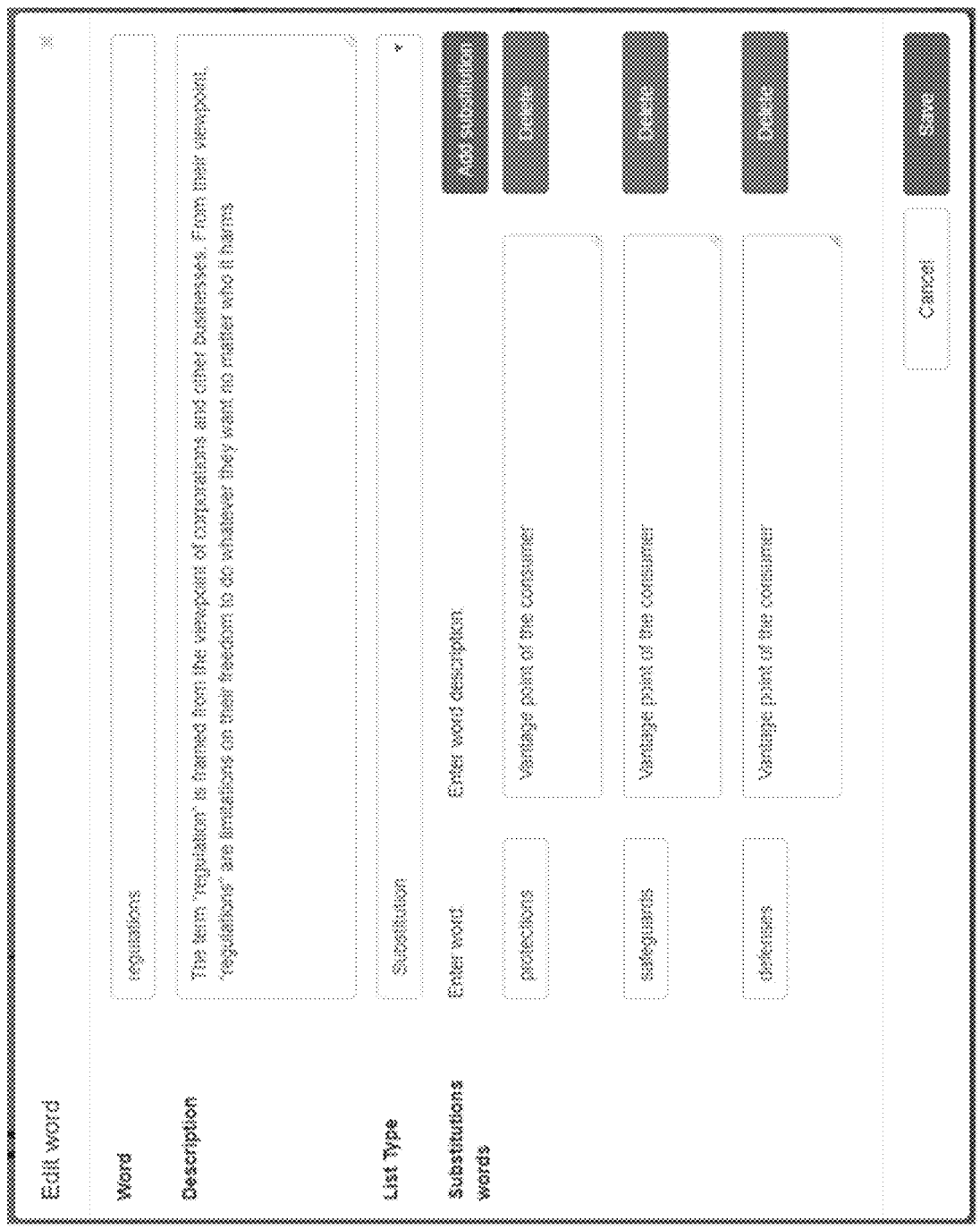
FIG. 11 illustrates a term configuration entry for the term "regulation" used in the configuration entry of FIG. 10.
Figure 12:
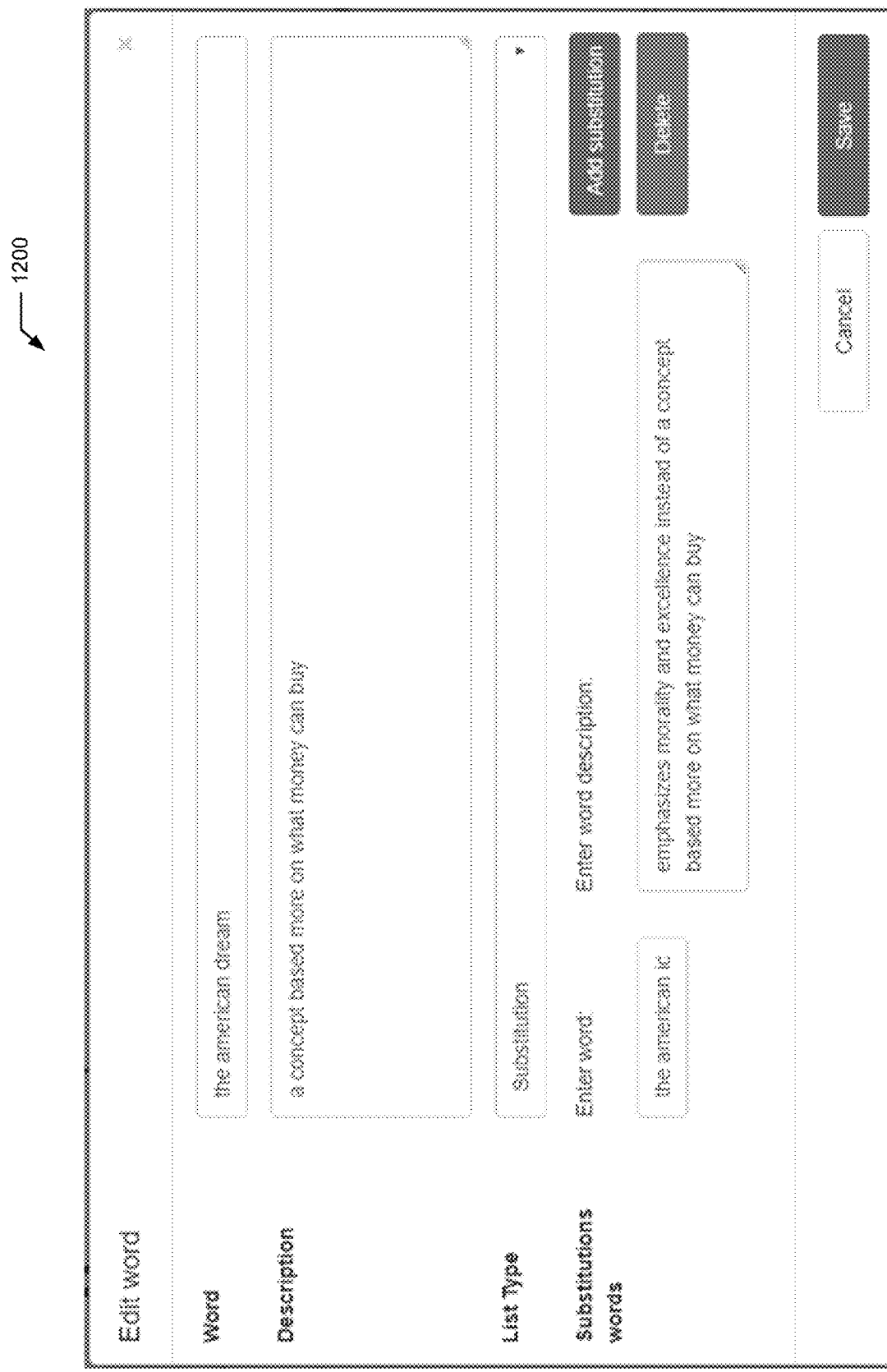
FIG. 12 illustrates a term configuration entry for the term "the american dream" used in the configuration entry of FIG. 10.
Figure 13:
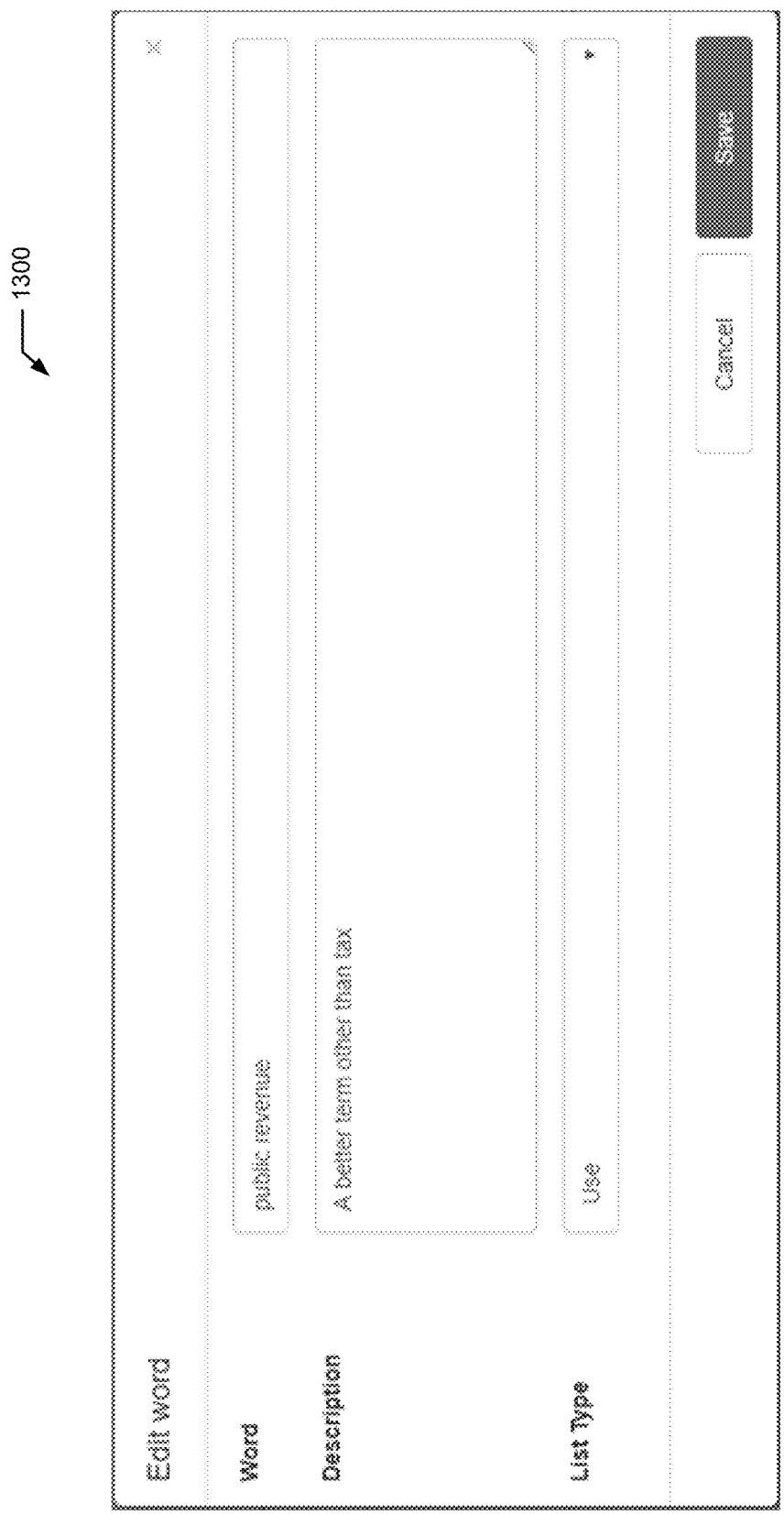
FIG. 13 illustrates a term configuration entry for the term "public revenue" used in the configuration entry of FIG. 10.
Figure 14:
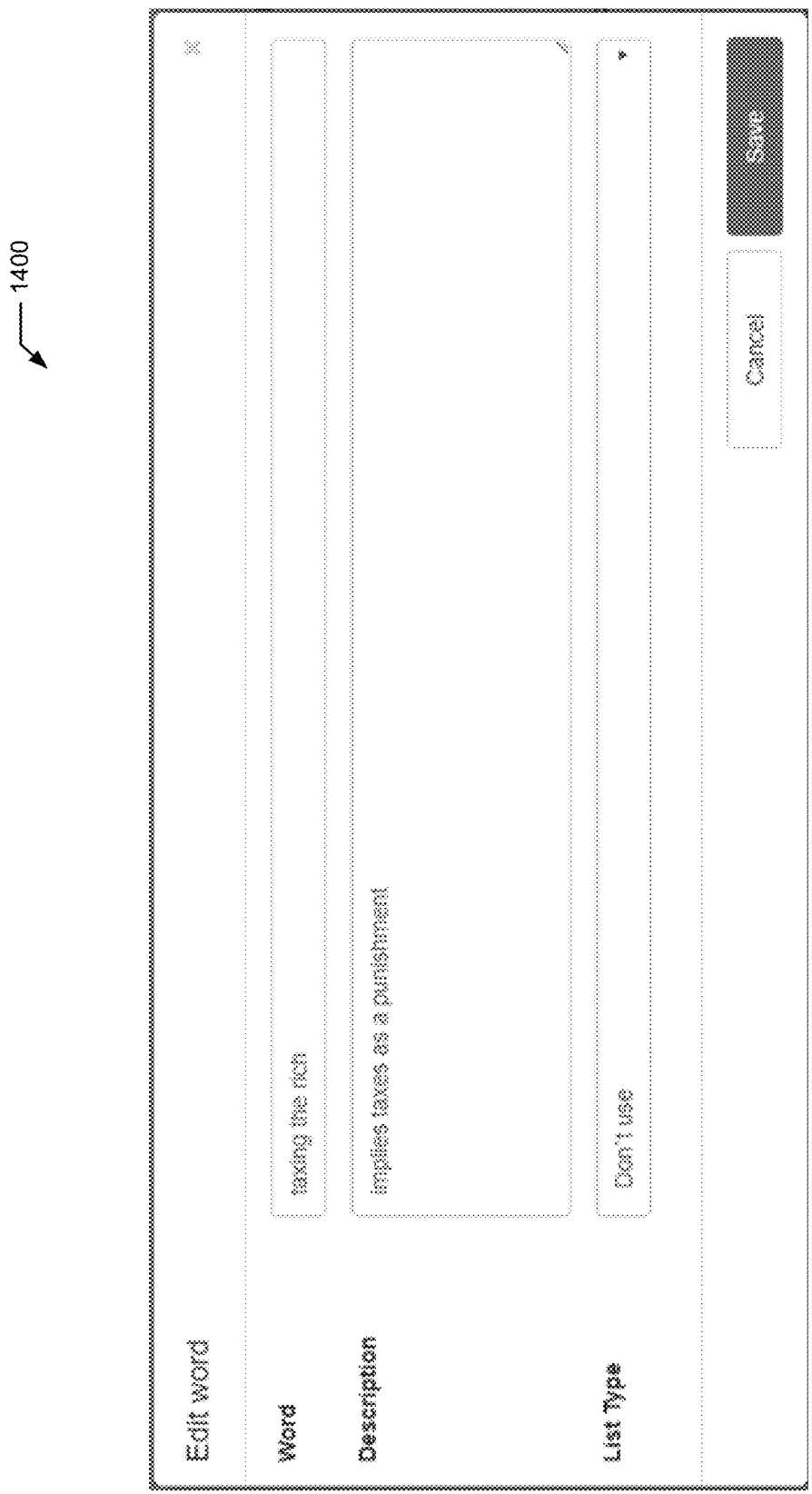
FIG. 14 illustrates a term configuration entry for the term "taxing the rich" used in the configuration entry of FIG. 10.

FIG. 11-FIG. 14 illustrate possible specific configurations for each of these terms. FIG. 11 illustrates a term configuration entry 1100 for the term "regulation" used in the configuration entry of FIG. 10, FIG. 12 illustrates a term configuration entry 1200 for the term "the american dream" used in the configuration entry of FIG. 10, FIG. 13 illustrates a term configuration entry 1300 for the term "public revenue" used in the configuration entry of FIG. 10, and FIG. 14 illustrates a term configuration entry 1400 for the term "taxing the rich" used in the configuration entry of FIG. 10.

Entry 1100 includes the term, a description, and being a substitution-type entry, one or more substitutions (in this case three substitutions, each substitution also including a description). Entry 1200 is similar but includes a single substitution. Entry 1300 and entry 1400 include the term, a description, and the use and don't use types, respectively. An annotation may be similar to use and don't use except the manner of highlighting and messaging may be different. In some implementations, an annotation type may include an option to delete the annotation after it has been considered (or a universal option to remove all annotations at once). A type of annotation type may be implemented by using a substitution type—having an annotation trigger word and the substitution be a <<null>> substitution which removes the annotation when selected.

Figure 15:
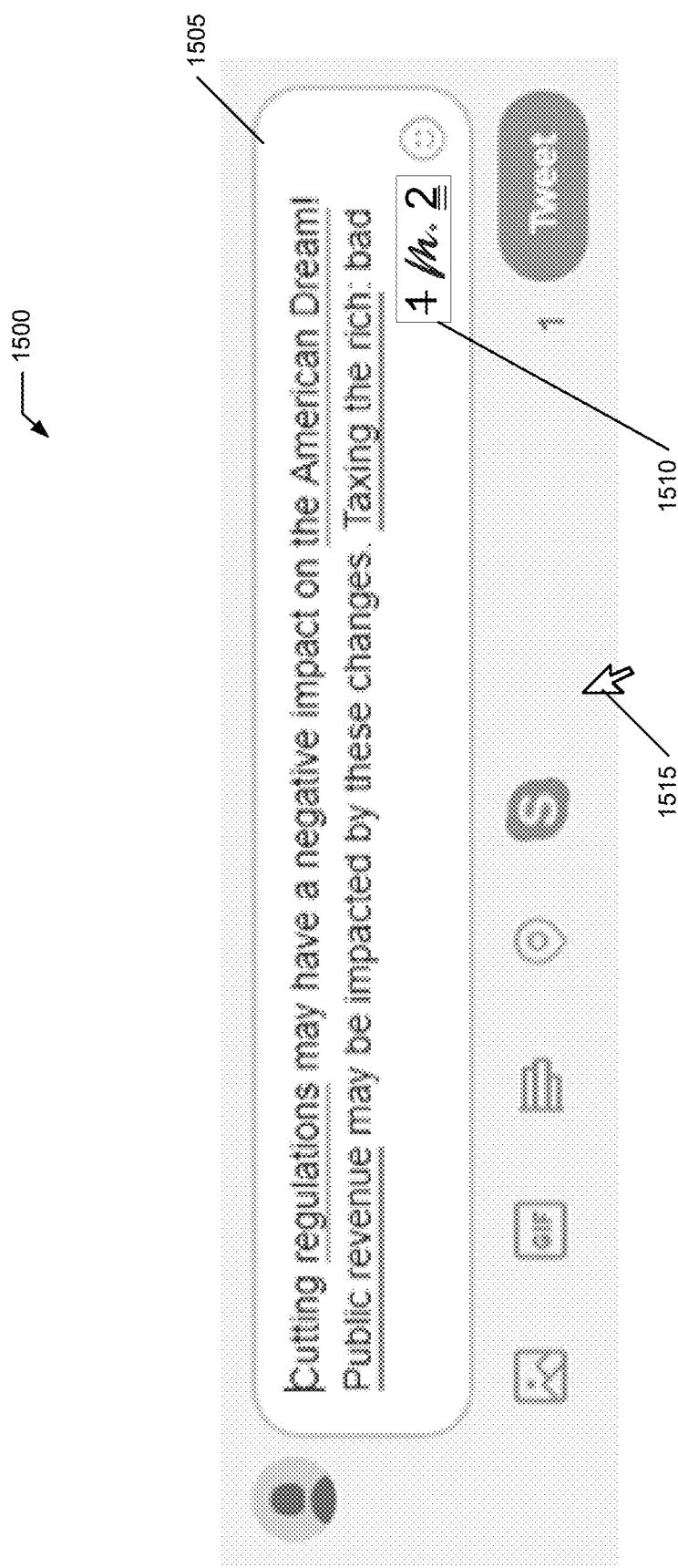
FIG. 15 illustrates an input field implementing an embodiment of the present invention.

FIG. 15 illustrates an input panel 1500 implementing an embodiment of the present invention. Panel 1500 includes an input control 1505 receiving input (e.g., text, uni-code, symbols, or the like) from the communicator, control 1505 developing the pre-communication. With the "Liberal" set actuated with the definitions provided in entries of FIG.

11-FIG. 14, the software engine (e.g., implemented by the extension in cooperation with a browser) periodically analyzes an entire state of the contents of panel 1505 using the parsing, highlighting, and messaging functions, among other functions.

The content of panel 1505 is "Cutting regulations may have a negative impact on the American Dream! Public Revenue may be impacted by these changes. Taxing the rich: bad" The software engine has identified the four triggers of the active set (regulations, the american dream, public revenue, and taxing the rich). This is confirmed by noting that the triggers are highlighted—the two substitution triggers are highlighted in yellow underlining (regulations and "the American Dream"), the use trigger "Public revenue" is highlighted in green underlining, and the don't use trigger "Taxing the rich" is highlighted in red.

An extension modal control 1510 may be superimposed in, or associated with, panel 1505, such as for compatible sites. Modal control 1510 may provide an alternative to launching an expanded user interface prepopulated with the content of panel 1505 by moving a cursor 1515 to control 1510 and clicking it. Modal control 1510 may also include visual summary information of triggers—in this case the numbers 1 and 2 indicate the number of don't use and substitution triggers that were found in panel 1505. The number associated with don't use triggers may be colored red, underlined in red, or be stricken through, whichever is understood to be associated with don't use. Similarly, the 2 in modal control 1510 identifying the number of substitutions identified in panel 1505 are similarly highlighted to match the substitution identification (e.g., yellow text, yellow underlining, yellow strikethrough).

Figure 16:
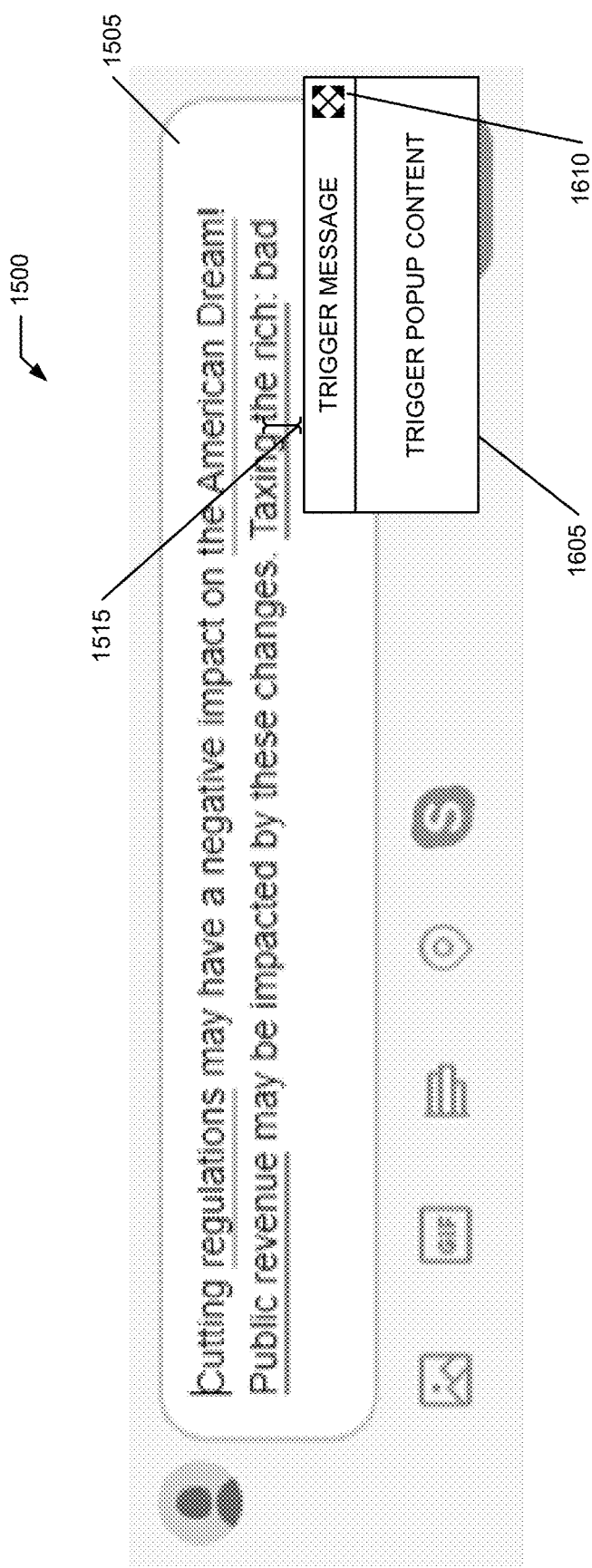
FIG. 16 illustrates a presentation pop-up interface used in the context of the input field of FIG. 15 when a cursor is positioned relative to an identified trigger term.

FIG. 16 illustrates a presentation pop-up interface 1605 used in the context of the input field of FIG. 15 when cursor 1515 is positioned relative to an identified trigger term (e.g., "Taxing the rich"). As the cursor moves into a control able to accept text, it may change from a selection cursor (e.g., arrow shown in FIG. 15) to an "I" beam cursor illustrated in FIG. 16. In the illustrated embodiment, the software engine is configured to respond to each highlighted trigger and present a pop-up. The content of the pop-up depending upon the type of trigger and how it was configured in the term entry database.

For example, as illustrated, each interface 1605 includes 3 elements: a trigger message, trigger popup content, and an expanded interface control 1610. The trigger message may be: "Advise against use of this term" for don't use triggers, "Advise use of this term" for use triggers, "Alternative(s) for this term" for substitutions, and "You may want to consider" for annotations.

Trigger popup content for use, don't use, and annotations may include just the descriptions associated with that trigger. Trigger popup content for the substitutions is more extensive: the various alternatives may be presented, a transition phrase "You may want to consider the following before using the term or an alternative:" and then the description. In some embodiments, the transition and description may be presented before the alternatives. The system is operative to respond to selection of any of the identified alternatives to change the pre-communication with the alternative language. Control 1610 is active to launch the expanded menu illustrated in FIG. 17.

FIG. 17 illustrates an embodiment of an expanded user interface 1700 produced from presentation pop-up interface 1610. Interface 1700 includes a dialog that may be divided into several panes. An embodiment as illustrated may include four panes: a pre-communication pane where editable content is prepared, a set identification pane where actuated selected sets are presented (content matches the actuated sets from extension menu 800 of FIG. 08), an extension interface pane which dynamically changes content based upon selected options—such as when hovering over the highlighted "regulations" trigger in the pre-communications pane, the extension interface pane displays the content that would be presented in the popup using more space (thus easier to read and interact), and a footer pane where options for copy all, test all, recommend, and leave feedback may be available.

Highlighting different triggers in the pre-communications pane changes the content of extension interface pane. Highlighting one of the actuated sets in the set identification pane may provide summary information of the selected pane in the extension interface pane. In some cases, more detailed information may be provided regarding categories, triggers, additional description popups for substitution options. That is, the descriptions associated with the substitution term may be presented as a popup in the extension interface pane. Moving cursor over protections, safeguards, or defenses would allow those descriptions to appear in a pop-up (as the popup in FIG. 16 presents the description of the trigger and not of the alternatives).

As noted, there may be different ways to activate interface 1700. When activated from a compatible site using control 1610, pre-communication pane is prepopulated with content from panel 1510 as it existed when expanded interface 1700 was launched. In some cases, it may be necessary or desirable to start with pre-communication pane empty and unpopulated. A compatible site also allows any edits/changes to the content of the pre-communication pane to be returned to panel 1510 when interface 1700 is closed.

For incompatible sites, or for use of the content of pre-communication pane in other applications and input dialogs, the "copy all" control is a quick way to copy the content of pre-communication pane to the clipboard for later use in one or more other applications, dialogs, interfaces, or the like wherever contents of the clipboard may be used.

Another control in the footer pane is the "test all" feature. This control may also be present in one of the manage set configuration pages for testing a set while in the set creation mode. The "test all" generates all the triggers of a selected set of sets (the set under management during set creation, one or more sets identified in the set identification pane, or other identified set(s)). This is an easy way for the communicator to evaluate all the triggers in the set of sets for possible use with their communications (especially "use" or "annotation" terms, but all types are presented and may advantageously appear in response to actuation of the "test all" control.

The software engine of some embodiments is configured for conflict resolution. Namely how to respond when the same trigger term appears in multiple actuated sets. One method of resolution is to assign a priority to each set or order the sets into a hierarchy. A trigger term in the highest priority or in the highest hierarchy is selected by the software engine among all the actuated sets using that trigger term.

Another option is to provide a special highlighting for such trigger term. Popup 1605 operates as noted herein responsive to the highest priority trigger term. That is, the condensed inline realtime interface performs as if there is a single trigger term, except for the special indication. (There may be other ways to implement this indication or resolution of multiple active trigger terms.)

However, expanded menu 1700 allows additional options to be presented to the communicator. Hovering a cursor over the special highlighting will have extension interface pane detail the conflicts—it may identify the highest priority trigger (and alternatives when it is a substitution) and it will provide guidance on what the other triggers are. For example, it may say that the trigger term is also used in x number other sets, and identifying the different triggers in the different sets.

In some embodiments, the set names in the set identification pane having a relevant trigger to the highlighted term may be presented with appropriate highlighting. That is, a set name having a substitution trigger for the highlighted term may be presented in yellow or double-underlining. A set name having a don't use trigger may have its name in red or strike-through. A set name having a user trigger may be presented in green or single-underline. Presenting the cursor over the highlighted set name may produce a popup detailing specifics of that trigger term for that set and/or additional information may be presented in the extension interface pane.

In some embodiments, there may be a mode where the software engine identifies alternative trigger terms not defined or configured in any of the actuated sets. For example, an extension may determine from context (e.g., what website is being used for formation of the communication) or the user may specify a context, or some other automatic determination or estimate may define a special mode for the system.

For example, a user from one part of the country may move to another part of the country and have a concern that their writing style and word choice identifies them as an outsider. From an analysis of common word forms and idioms used in the communicators new region, the system may make alternative suggestions for various commonly used terms. A type of customized regionalized limited thesaurus based upon an analysis of the actual terms used by the community of interest to the communicator (limited because not all options may be commonly used and customized because the term may not be always considered an equivalent term). Commonly used phrases of the community may be flagged for the communicator for consideration to be incorporated into their communications. These are not explicitly defined in any of the actuated sets, and may be enabled or disabled in the options menu, and may be highlighted differently from any other trigger terms as being automatically generated by the system. While these may not be crucial to a particular frame or metaphor employed, aligning the background lexicon with the audience may help the communicator fit into the audience more comfortably. Certain websites may have unique background lexicon that can be developed used for communications at those sites.

Another similar use is for English as Second Language (ESL) communicators. It can be the case that different cultures may struggle with different parts of the English language (but in similar ways to other persons of the same culture). For example, an ESL:Chinese_To_English Set may be particularly effective for certain Mandarin and/or Cantonese speakers when writing to a native English-speaking audience. Similarly and ESL:Spanish_To_English Set may be effective for a particular set of native language Spanish language speakers using English when communicating with a native English-speaking audience. Many similar sets may be developed to help any group, and in some cases an individual communicator may develop their own personal customized set. The same may be true for non-native French, Mandarin, Spanish, Russian, etc. learning a second language when their primary language is English or other language.

It is not required that trigger terms of one or more sets be manually configured and infrequently updated if at all. System 300 may include a supervisor function, for example as part of software 340 implemented by computer-executable instructions, to dynamically update content of one or more sets, such as in realtime and/or in response to messages and content of communications exchanged with others.

Increasingly a person, a group of persons, an entity, and/or a group of entities wish to collaborate or share online messaging, activities, events, or other communication elements, images, and the like with the public or a selected group of people.

There are numerous card-based party games, social, and skill-building exercises in which predefined resources (e.g., cards) are provided to participants and play includes sharing and commenting on these electronic resources. When those resources are included as trigger terms, annotations, term substitutions, and the like, an embodiment of the present invention may provide that a supervisor function manage these resources, including allocation and verification of resource use by and among the participant(s).

Some embodiments include engagement using public, group, and private communications, and the supervisor function may be provided access to this communication channel or a special private supervisor channel to exchange control messages.

The supervisor function may electronically determine and allocate electronic resources to various participants, enable access to those resources through dynamically updating set and trigger terms, and monitor the communication/supervisor channel to determine whether the participants are using the allocated resources. In a physical card system, provided that each card is unique, then only one person may possess it. In some implementations, the trigger terms and substitutions are advisory and the user interface cannot enforce that a participant will not communicate something that is not an allocated resource. However, the supervisor function may inform the audience/participants/others accessing the communication channel, that a response included non-allocated resources.

Some of these systems may include various systems for distributing, managing, accessing, using, and scoring use of allocated resources. The supervisor function may be enabled to manage, participate in, or supervise one or more of these roles.

For example, there are various card-based social games such as Apples to Apples or Cards Against Humanity, in which a master card sets a context, and participants play their own cards in response to the master card. In Apples to Apples, a green "communal" card is played, that card includes an adjective. Each participant includes some number of individual cards that include a noun, and the play includes each player playing some number (e.g., 1) individual card that that participant believes includes a particular noun that is a reasonable option to combine with the communal adjective. Thus there are as many adjective/noun combinations as players—each player contributing a "noun" card from their pool to be combined with the shared communal adjective card. Thereafter the played card has been used and may be removed from play. New cards are added to the players as specified by the rules, each card including a new noun. Typically the word lists are known in advance and each word is available on a single card available to be played one time.

Similarly, cards against humanity includes a shared communal card that may include a statement with some number of blanks. Each participant has some number of cards (e.g., 10), each including a word or phrase. For a round of play, in response to the shared communal card, each player shares a number of their cards, one card to substitute for a blank, N number of cards for a communal card with N blanks.

The supervisor function may manage these resources. It may "play" the communal card by producing a message to be sent on the participant social media channel (public or private channel) or sending a message directly to the channel. Each participant is provided with a solution set that includes a number of unique options for each player. That is, player 1 uses player1_set and player 2 uses player2_set, and for X number of players, player X uses playerx_set. Each set is defined with the proper number of options (for a hand to have 10 player cards, each set may identify 10 substitution options unique in each player set and drawn from the approved term pool for the game).

The substitution trigger may be a blank, and each player may thus substitution one their 10 substitution options for each blank (each option used once). As the player sends the response with the substitution, the supervisor function may monitor and confirm that the player has used an allocated resource and make a note of which resource(s) have been used. The supervisor function may thereafter dynamically reconfigure each players' set to remove the used resources and allocate new resources.

Different embodiments may include different rules for scoring, refreshing cards, drawing new cards, and the like. The supervisor function may include controls for implementing and/or tracking these elements of play. As the supervisor function is available to allocate resources and to verify a response is consistent with allocated resources, it is possible to use social media or other communication resources in cooperation with the supervisor function accessing that social media or communication resource to participate in group games very simply and casually with confidence that the players are not employing unallocated resources.

The allocated resource may include a supervised result of a "roll" (virtual roll or generation) of a set of die or operation of a random number generator or pseudo random number generator. That is, the extension may provide a substitution option that includes a result or set of results of a server-produced random number generation. As long as the participant uses that server-produced result or set of results, the supervisor function will indicate on the social media channel that the result is a valid allocated resource (each random result or set of results is allocated in this sense).

This means that games of chance may be enjoyed through a social media communication channel, and an audience may observe and comment as desired/enabled. For example, a game of Yahtzee, Life, Chutes and Ladders, backgammon, and the like or other multi-die rolling game may be implemented using a supervisor function communicated to one or more dynamic solution sets that are able to allocate and monitor various resources. Some embodiments may be able to implement a game such as Monopoly or other board game where a user rolls one or more die and moves a piece to a particular square, and that square includes a set of options.

Some embodiments may include an implementation of a computer text adventure game (colossal cave and the like) in which there are a known set of options/resources and one or more participants are able to send text commands to change an assignment or allocation, the supervisor function able to monitor options, verify use of allocated resources, allocate and reallocate resources, and the like. All simply performed within a social media environment or other shared communication medium.

Described herein have been some embodiments for collecting various types of metrics on a set, a user, combinations thereof, or other information. In some embodiments, it may be desirable to gauge an effectiveness of a communication, and to thereby obtain some indication of the effectiveness of a set and/or of a communicator. Some sites include some type of feedback or reputation system for users of that site. Those systems are generally not configured to allow a system of the present invention to access the reputation systems of all the different sites that may be used by the communicators using the software engine. Even if that were the case, it may be difficult if at all possible, to match the users of the other sites to the users of the software engine to be sure that the correct reputation is associated with the correct communicator.

Typical reputation systems (like/don't like) may be inappropriate for a communication system that may be used to develop communications to an audience that may be predisposed against the message. A communication reputation system may include alternative to like and don't like. An important part is that the reputation system will include options to enable an effectiveness of a particular communication, using a particular collection of actuated sets, and perhaps information (which may be anonymized about the communicator) to be measured by system 300.

One possible way to do this is to create a unique identifier for each communication that is associated with the desired set of information. That identifier may be included explicitly or implicitly with a communication, along with a link back to system 300 requesting feedback. Communicators may elect not to include this option or what information to be included.

A party providing feedback/reputation input using the link-back system adds to the cumulative reputation information for evaluation of the communication, its lexicon, the actuated sets, and in some cases when authorized, information (which may be anonymized) about the communicator or a class of communicators that include the specific communicator. Privacy terms should be disclosed and followed. That reputation feedback is preferably as small an imposition on the audience as possible—and may just record which of the presented reputation feedback options was chosen.

As noted herein, in some cases it may be desirable to provide for creation, maintenance, and use of private sets. Some set creators may not wish to share their triggers, descriptions, annotations, and alternatives to the world-at-large. In such case, one option is to provide for private sets that are undetectable to unauthorized communicators. A communicator must be provided with credentials and/or be invited to access a private set. A set creator may have special tools to monitor users, add/remove users, receive metrics, and the like regarding the users and uses of their private set.

In some embodiments, whether for a private set or certain public sets, it may be that a community desires to develop, test, and refine particular term configurations for a set. System 300 may provide for various collaboration tools, which may have limited participants, for discussing and configuring the terms of a set. Those discussions may also be maintained in private when necessary or desired.

As noted herein, some embodiments employ a content-state check of the content of an input panel using the software engine. These embodiments are different from a text expansion function which compares a string of consecutive symbols as they are typed looking for a match against various expansion terms. A subsequent edit of a word will not cause that edited word to be matched and used for expansion. Also, expansion functions do not respond to potential triggers in a block of pasted text. A user who passes up an expansion option does not have a second chance.

In contrast, with the content-state check employed by these embodiments, changes, edits, and pastes are all continuously periodically evaluated by the software engine against the possible triggers. A user may initially ignore a trigger and go back one or more times to consider its appropriateness for the current communication.

And this state checking, when combined with the substitution system as described herein, allows some embodiments to include nested substitutions which can provide for a form of templating.

The substitutions that are enabled by the software engine are not limited to one or a few words or symbols. An embodiment may provide that a trigger term could be substituted with multiple words, sentences, paragraphs, pages, documents, or the like. All manner of content may be included in that substitution content.

What may be substituted is content that also includes one or more substitution triggers identifying different alternatives (which may also be of any length and of any content including other trigger terms). This nesting may be repeated many times, a nest depth of N, N a real positive integer number element of the set {1, 2, 3, 4, 5, 6, 7, 8, 9, 10 . . . 100 or more}.

The content state is checked after each substitution and new words may be juxtaposed to other words that were not so presented before and those new juxtapositions may now define a trigger term. While generally a set configuration would tend not to include don't use trigger terms in a substitution alternative, the present invention provides allowance for multiple sets, from different creators, on different topics, to all be selected (e.g., enrolled) and actuated at once in parallel. Thus some substitution alternatives may represent a trigger term in a different set. This may lead to complex interactions as a communicator addresses the applicable actuated sets.

In addition to that, the template feature provides predetermined content in response to a template substitution trigger. In some embodiments, this may look like an ordinary substitution but it may be otherwise longer. For example, consider the following substitution configurations: %templates=>%template1 & %template2 (a substitution trigger named "%templates" includes two alternatives: "%template1" and "%template2" for use by the communicator. The set configuration further configures "%template1" as a substitution which may be extended content for a generic thank you e-mail and configures "%template2" as a substitution which may be extended content for a generic solicitation e-mail. Each of these e-mails may also include substitution triggers (e.g., % names) which lists many different names for use with the template. When each template content includes the same template trigger term, those template elements "share" the content of those substitutions. Thus the two templates may share the same set of names when properly configured.

This simple feature allows for the possibility of extensive templates using simple substitution trigger terms and content state checking.

The above interface, interface elements, and interface controls can be implemented in the general context of instructions executed by a stored program computer system coupled to a memory storing those instructions. Such computer-executable instructions may include programs, routines, objects, components, data structures, and computer software technologies that can be used to perform particular tasks and process abstract data types. Software implementations of the above described methods may be coded in different languages for application in a variety of computing platforms and environments. It will be appreciated that the scope and underlying principles of the above described methods are not limited to any particular computer software technology.

Moreover, those skilled in the art will appreciate that the above described methods may be practiced using any one or a combination of computer processing system configurations, including, but not limited to, single and multi-processor systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program means recorded thereon for directing the computer processor to facilitate the implementation and practice of the above described methods. Such devices and articles of manufacture also fall within the spirit and scope of the present invention.

As will be described, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

FIG. 03 illustrates system 300 for updating and/or using frame communications, such as by using a computer-implemented method to automate or assist in production and distribution of framed communications. A communications producer may essentially produce and distribute a communication to multiple sets of recipients, each set of recipients may receive different versions of the same communication adjusted using a different set of lists applicable to each set of recipients. System 300 includes a user interface 310, such that an operator can actively input information and review operations of system 300, or a third party may create and manage lists, or a third party may participate in an auction system to identify particular sets of communication producers for productions and distributions of targeted messaging (including to the set of identified communications producers), or update and maintenance of elements of system 300. User interface 310 can be any mechanism, structure, apparatus, machine, or article of manufacture in which a person is capable of interacting with system 300 such as a keyboard, mouse, microphone, pen/tablet, or touch-screen display. Operator-entered data input into system 300 through user interface 310, can be stored in a database 320. Frame communications data, including for example, frame lists, users, communications producers, list producers, enrollments, auctions, data mining results and operations, metrics, assessments, established by system 300 and/or received by one or more frame developers 330 or automated frame developer processors, can also be input into system 300 for storage in database 320. Additionally, any information generated by system 300 can be stored in database 320.

Database 320 can store user-defined variables, equations and parameters used at the front-end, back-end, management of user accounts, producer accounts, developer accounts, lists, hierarchies, substitutions, hints, data mining and statistical models and results, assessments, profiles, metrics, surveys, and the like are all examples of information that can be stored in database 320.

System 300 includes a computer program product or software 340 that is stored on a non-transitory processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, software 340 can include a plurality of modules for performing system tasks such as performing the methods previously described herein. A processor 350 interprets instructions to execute software 340, as well as, generates automatic instructions to execute software for system 300 responsive to predetermined conditions. Instructions from both user interface 310 and software 340 are processed by processor 350 for operation of system 300. In some embodiments, a plurality of processors can be utilized such that system operations can be executed more rapidly.

In certain embodiments, system 300 may include an interface subsystem 360 to provide information or interfaces (server for content of panels and input interface elements described herein to the operator(s), a set of communications producer(s), a set of third party list producers or communications/messaging brokerages (e.g., advertisers using frames) or to other systems (not shown). For example, interface unit 360 can include a printer, display screen, a data storage device or multiple interface processes interacting with various users.

Communication between any components of system 300, such as user interface 310, database 320, reservoir data collectors 330, software 340, processor 350 and interface unit 360, can be transferred over a communications network 370. Communications network 370 can be any mechanism that allows for information transfer. Examples of communications network 370 presently include, but are not limited to, a switch within a computer, a personal area network (PAN), a local area network (LAN), a wide area network (WAN), and a global area network (GAN). Communications network 370 can also include any hardware technology used to connect the individual devices in the network, such as an optical cable or wireless radio frequency.

In operation, an operator initiates software 340, through user interface 310, to perform the methods described herein. Outputs from software 340 can be stored in database 320. For example, software 340 can monitor and implement a set of enrolled, selected, and active lists for each producer of the set of communications producers (monitoring the communications elements in realtime) and any relevant data and then be implemented by interface 100 to produce one or more interfaces, such as interface 300i.

Also, an article of manufacture for use with a computer processor, such as a CD, pre-recorded disk or other equivalent devices, could include a computer program storage medium and program mechanisms recorded thereon for directing the computer processor to facilitate the implementation and practice of the above described methods. Such devices and articles of manufacture also fall within the spirit and scope of the present invention.

The invention may be implemented in numerous ways, including for example as a method (including a computer-implemented method), a system (including a computer processing system, general purpose, special purpose, hybrid, embedded, and the like), an apparatus, a computer readable medium, a computer program product, a graphical user interface, a web portal, or a data structure tangibly fixed in a computer readable memory. Several embodiments of the present invention are discussed herein. The appended drawings illustrate only typical embodiments of the present invention and therefore are not to be considered limiting of its scope and breadth. The system, methods, and computer-program products have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

The system may include a computer program product or software that is stored on or in a non-transitory processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, the software can include a plurality of modules for performing system tasks such as performing the methods previously described herein. A processor interprets instructions to execute the software, as well as, generates automatic instructions to execute software for system responsive to predetermined conditions. Instructions from both the user interface and the software are processed by the processor for operation of interface 100. In some embodiments, a plurality of processors can be utilized such that system operations can be executed more rapidly.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A stored program processor-implemented machine operative to a set of instructions executable on a processor, the executed instructions implementing a method processing a user input content into a content receiving control, comprising:
   an electronic content input system, supported by the processor, providing the content receiving control;
   a database storing a first set of communications guidance elements, each said communications guidance element includes a trigger and an associated action; and
   a comparator process, coupled to said electronic content input system and communicated to said database, analyzing the user input content against said first set of communications guidance elements testing a state of the user input content against said triggers, said processor initiating said associated action for each trigger testing positive, wherein said state excludes only a series of most-recently input characters.

2. The machine of claim 1 wherein said database includes a second set of communications guidance elements including at least one communications guidance element with at least one particular trigger equivalent to at least one trigger from a communications guidance element of said first set of communications guidance elements said particular one trigger having an associated action different from associated action associated with said trigger from said communications guidance elements from said first set of communications guidance elements.

3. The machine of claim 2 wherein said comparator process provides a hierarchy management process, executable on the processor, to resolve a conflict between said associated actions from different sets of communications guidance elements with matching triggers when said matching triggers test positive against the user input content.

4. The machine of claim 3 wherein each said associated action is associated with a subset of said state of the user input content wherein said subset is less than an entirety of the user input content.

5. The machine of claim 4 wherein the user input content is provided by a user and wherein said associated action includes a presentation of said conflict to said user.

6. The machine of claim 3 wherein the user input content is provided by a user and wherein said associated action includes a presentation of said conflict to said user.

7. The machine of claim 2 further comprising a selection process, executable on the processor, wherein a user may selectively enroll or disenroll any set of communications guidance elements, and wherein only triggers of communications guidance elements of enrolled sets of communications guidance elements may be enabled to be tested against the user input content.

8. The machine of claim 7 wherein said selection process implements a selective actuation and deactuation of enrolled sets of communications guidance elements, and wherein only triggers of communications guidance elements of actuated and enrolled sets of communications guidance elements may be enabled to be tested against the user input content.

9. The machine of claim 2 wherein each said associated action is associated with a subset of said state of the user input content wherein said subset is less than an entirety of the user input content.

10. The machine of claim 1 including an indicator, implemented by the processor, associated with, and outside, the user input control to provide an indication of at least one positive test of the user input content without performing one or more associated actions of triggers associated with said positive tests of communications guidance elements.

11. The machine of claim 1 wherein said electronic content input system is local to a user, said database is remote from said user, and said comparator process is local to said user.

12. The machine of claim 1 wherein the user input content includes a set of characters and wherein said associated triggers include a series of characters, each series including a selective highlighting indicating one of a set of actions associated with each particular series of characters, said set of actions including a particular first action including one or more of use, don't use, substitution, with associated alternative series of characters, and annotations.

13. The machine of claim 12 wherein each said action includes a commentary regarding a description of said associated action of each particular series of characters.

14. The machine of claim 12 wherein each said associated action is associated with a subset of said state of the user input content wherein said subset is less than an entirety of the user input content.

15. The machine of claim 12 wherein the user input content is provided by a user and wherein said associated action includes a presentation of said particular action to said user for user-optional actuation of said particular action.

16. The machine of claim 12 wherein said state of the user input content includes multiple different content portions with each different content portion including one or more multiple positive tests for different triggers, and wherein each said action associated with each different portion selectively responsive to said associated action wherein said associated action is operable on only said different content portion to change said state.

17. The machine of claim 1 wherein said associated action is associated with a subset of said state of the user input content wherein said subset is less than an entirety of the user input content.

18. The machine of claim 1 wherein said state of the user input content includes multiple different content portions with each different content portion including one or more multiple positive tests for different triggers, and wherein each said action associated with each different portion selectively responsive to said associated action wherein said associated action is operable on only said different content portion to change said state.

* * * * *